US012559406B2

(12) United States Patent
Hurst et al.

(10) Patent No.: US 12,559,406 B2
(45) Date of Patent: Feb. 24, 2026

(54) METHOD AND APPARATUS FOR SHAPING A GLASS SHEET

(71) Applicant: Pilkington Group Limited, Lancashire (GB)

(72) Inventors: Michael Hurst, Lancashire (GB); John George Lee, Merseyside (GB); Joachim Pilz, Oer-Erkenschwick (DE)

(73) Assignee: Pilkington Group Limited, Nr. Ormskirk Lancashire (GB)

( * ) Notice: Subject to any disclaimer, the term of this patent is extended or adjusted under 35 U.S.C. 154(b) by 0 days.

(21) Appl. No.: 18/438,613

(22) Filed: Feb. 12, 2024

(65) Prior Publication Data

US 2024/0182347 A1 Jun. 6, 2024

Related U.S. Application Data

(63) Continuation of application No. 16/613,943, filed as application No. PCT/GB2018/051501 on Jun. 1, 2018, now abandoned.

(30) Foreign Application Priority Data

Jun. 1, 2017 (GB) ..................................... 1708758

(51) Int. Cl.
C03B 23/03 (2006.01)
C03B 23/023 (2006.01)
(Continued)

(52) U.S. Cl.
CPC ...... *C03B 23/0307* (2013.01); *C03B 23/0235* (2013.01); *C03B 23/0258* (2013.01);
(Continued)

(58) Field of Classification Search
None
See application file for complete search history.

(56) References Cited

U.S. PATENT DOCUMENTS 2,984,943 A 5/1961 Gerald
3,507,639 A 4/1970 Seymour
(Continued)

FOREIGN PATENT DOCUMENTS

EP 0398759 A2 11/1990
EP 0431895 A2 6/1991
(Continued)

OTHER PUBLICATIONS

English Translation of the Office Action (Notification of Reasons for Refusal) issued Feb. 1, 2022, by the Japanese Patent Office in corresponding Japanese Patent Application No. 2019-566308.
(Continued)

*Primary Examiner* — Queenie S Dehghan
(74) *Attorney, Agent, or Firm* — BUCHANAN INGERSOLL & ROONEY PC

(57) ABSTRACT
A method of shaping a glass sheet includes heating the glass sheet to a temperature for shaping, positioning the glass sheet on a shaping support, and shaping the glass sheet on the shaping support, wherein during the shaping of the glass sheet at least one portion of the glass sheet is deliberately cooled. The shaping of the glass sheet involves press bending a heat softened glass sheet between a lower shaping support and an upper shaping member, wherein during the shaping of the glass sheet on the shaping support only a portion of the major surface of the glass sheet facing the lower shaping support is cooled by directing one or more jets of air onto said portion.

19 Claims, 10 Drawing Sheets

(51) Int. Cl.

| | |
|---|---|
| *C03B 23/025* | (2006.01) |
| *C03B 23/035* | (2006.01) |
| *C03B 27/04* | (2006.01) |
| *C03B 27/044* | (2006.01) |

(52) U.S. Cl.
CPC ...... *C03B 27/0404* (2013.01); *C03B 27/0413* (2013.01); *C03B 27/0442* (2013.01); *C03B 23/0357* (2013.01)

(56) References Cited

U.S. PATENT DOCUMENTS

| | | | |
|---|---|---|---|
| 4,749,399 | A | 6/1988 | Yamada et al. |
| 4,826,522 | A | 5/1989 | d'Iribarne et al. |
| 5,021,075 | A | 6/1991 | Vanaschen et al. |
| 5,053,069 | A | 10/1991 | Vanaschen et al. |
| 5,122,177 | A | 6/1992 | Yoshizawa et al. |
| 5,679,124 | A | 10/1997 | Schnabel et al. |
| 6,321,570 | B1 | 11/2001 | De et al. |
| 2005/0268661 | A1 | 12/2005 | Yoshizawa et al. |
| 2010/0050694 | A1 | 3/2010 | Dajoux et al. |
| 2015/0007612 | A1 | 1/2015 | King et al. |
| 2015/0251943 | A1 | 9/2015 | Wada et al. |
| 2018/0281567 | A1 | 10/2018 | Fisher et al. |
| 2021/0087097 | A1 | 3/2021 | Ash et al. |
| 2021/0403363 | A1 | 12/2021 | Hurst et al. |

FOREIGN PATENT DOCUMENTS

| | | | |
|---|---|---|---|
| EP | 2918556 | A1 | 9/2015 |
| FR | 1176617 | A | 4/1959 |
| JP | H03183628 | A | 8/1991 |
| JP | H03208824 | A | 9/1991 |
| JP | H0581237 | U | 11/1993 |
| JP | 2017508693 | A | 3/2017 |
| WO | 9705074 | A1 | 2/1997 |
| WO | 2004085324 | A1 | 10/2004 |
| WO | 2006110145 | A1 | 10/2006 |
| WO | 2012166365 | A1 | 12/2012 |
| WO | 2015092365 | A1 | 6/2015 |
| WO | 2015092385 | A1 | 6/2015 |

OTHER PUBLICATIONS

Great Britain Search Report for Application No. GB 1708758.6 dated Nov. 30, 2017.
International Search Report (PCT/ISA/210) mailed on Aug. 24, 2018, by the European Patent Office as the International Searching Authority for International Application No. PCT/GB2018/051501.
Written Opinion (PCT/ISA/237) mailed on Aug. 24, 2018, by the European Patent Office as the International Searching Authority for International Application No. PCT/GB2018/051501.
Notification of Second Office Action issued Jun. 29, 2022, by the Chinese Patent Office in Chinese Patent Application No. 201880035632.8.
Rejection Decision issued Dec. 28, 2022, by the Chinese Patent Office in Chinese Patent Application No. 201880035632.8.
Yingjun, Wang, "New Materials Science and Technology Inorganic Materials vol. l", South China University of Technology Press, Oct. 2016, English Translation, pp. 285-288.

METHOD AND APPARATUS FOR SHAPING A GLASS SHEET

CROSS-REFERENCES TO RELATED APPLICATIONS

The present application is a continuation of U.S. patent application Ser. No. 16/613,943, filed Nov. 15, 2019, which is a U.S. National Stage of International Application No. PCT/GB2018/051501, filed Jun. 1, 2018, and claims the benefit of Great Britain Application No. 1708758.6, filed Jun. 1, 2017. The entire contents of U.S. patent application Ser. No. 16/613,943, International Patent Application No. PCT/GB2018/051501 and Great Britain Application No. 1708758.6 are incorporated herein by reference.

The present invention relates to a method of shaping a glass sheet and to apparatus for shaping a glass sheet.

It is known that a laminated glazing for a vehicle windscreen usually comprises two bent sheets of glass joined by at least one adhesive layer, usually polyvinyl butyral (PVB). It is conventional in the art to refer to each glass sheet as a "ply". Often the adhesive layer is referred to as a "ply" i.e. a ply of PVB. The glass sheet configured to face the interior of the vehicle in which the laminated glazing is installed is often known as the "inner ply" and the glass sheet configured to face the exterior of the vehicle in which the laminated glazing is installed is often known as the "outer ply".

Each of the sheets of glass used in a laminated glazing for a vehicle is usually bent in one or two mutually perpendicular directions such that the laminated glazing is curved and many methods are known for bending initially flat glass sheets to a desired curvature.

One known method is to bend a pair of glass sheets at the same time, one sheet of glass on top of another and separated with a suitable "parting powder" such as calcium carbonate. The inner ply and outer ply are bent at the same time by gravity sag bending.

Another method is to bend the inner ply and the outer ply at different times, usually one after the other, thereby forming the inner ply and the outer ply individually.

One such method of bending the flat glass sheets individually involves conveying heated flat glass sheets between a pair of complementary shaping members and press bending each glass sheet separately. The glass sheets can then be cooled, brought together and laminated using a suitable adhesive interlayer such as PVB. Such methods are described in EP0398759A2 and WO2004/085324A1.

A factor that has received much attention in the prior art is the stress characteristics of the individual glass sheets, either when used as a monolith or when used as a ply in a laminated glazing, and methods are known in the prior art to vary the stress characteristics of the final glass sheet. Given that in a laminated window for a vehicle, one of the surfaces of the laminated window is exposed to the outside elements, the properties of this surface are particularly important. For example, the window should be able to withstand sufficient impact from stones and to have sufficient scratch resistance, which in the case of a windscreen, may be due to wiper blades.

Prior art solutions have altered the edge stress of a bent glass sheet after the glass sheet has been formed. WO97/05074A1 describes a cooling ring assembly and method for controlling stresses in a bent glass sheet. The cooling ring assembly includes a cooling ring that supports the glass sheet edge, an insulator juxtaposed inboard of the cooling ring to reduce the cooling rate, and a cooler for providing increased cooling to at least one localised area of the glass sheet edge.

US2005/0268661A1 describes a method for manufacturing a curved glass plate by pressing a heated glass sheet between an upper mould and a lower mould, wherein the formed glass plate is cooled on the lower mould. During the step of cooling the glass sheet on the lower mould, the lower mould is heated whereas an inner portion of the glass sheet placed in contact with the lower mould is forcibly cooled.

U.S. Pat. No. 6,321,570B1 describes a method of and apparatus for bending and tempering a sheet of glass heated to a formable state.

EP0431895A2 relates to a sheet glass bending and tempering apparatus for bending and tempering a glass sheet at one stage.

U.S. Pat. No. 4,749,399 describes a ring mould unit for shaping and tempering a glass sheet. A cooling ring is used to support the bent glass sheet while the glass sheet is being quenched and tempered by a cooling medium.

U.S. Pat. No. 4,826,522 describes the tempering of sheets of glass and optionally their bending by the so-called contact process.

WO2006/110145A1 describes a furnace including a section defined as a heating section capable of attaining a predetermined temperature, the heating section having an entrance end and an exit end; a section defined as a cooling section capable of having a temperature gradient from entrance end of the cooling section to exit end of the cooling section, the entrance end of the cooling section mounted in a fixed relationship to the exit end of the heating section; a section defined as an edge cooling section between the exit end of the heating section and the entrance end of the cooling section; and an edge cooling device positioned in the edge cooling section relative to a predetermined area, and capable of cooling at least selected peripheral portions of the predetermined area at a faster rate than centre portions of the predetermined area. Soon after the glass sheets attain their desired curvature, the shaped glass sheets are moved into the edge cooling section.

It is known from "Glass Processing Days, 13-15 Sep. '97, pages 385-389" that surface and edge stress may be introduced into a windshield due to the lamination process itself. FIG. 5 in this publication shows a laminated glazing with a non-uniform lamination gap. It is said the laminating forces introduce surface tension in the final laminated glazing.

Usually issues due to an uneven lamination gap are minimized by ensuring each glass sheet for the inner and out ply are suitably bent as described above, for example by using a nested pair, or by using a suitably controlled bending process for each individual ply.

However for certain laminated products it may not be possible to obtain two glass plies that are sufficiently well matched in shape such that lamination stress does not become important. For example, when a laminated glazing is produced using two different plies, each ply may be bent separately, often with a different bending process. Examples of such laminated glazings are described in WO2015/092385A1 where an outer ply is press bent and an inner ply is sag bent.

It has been found that upon laminating plies bent by different bending processes, the lamination gap may not be uniform resulting in increased lamination stresses of the type mentioned above and described in "Glass Processing Days, 13-15 Sep. '97, pages 385-389". The lamination stresses present in the final laminated glazing may be undesirable resulting in a final laminated glazing that does not have the desired properties.

Accordingly the present invention provides from a first aspect a method of shaping a glass sheet, the glass sheet having a first major surface and a second opposing major surface, the method comprising the steps:

(i) providing a shaping support for supporting the glass sheet;

(ii) a heating step for heating the glass sheet to a temperature suitable for shaping;

(iii) a positioning step for positioning the glass sheet on the shaping support such that the first major surface of the glass sheet is in contact with the shaping support; and (iv) a shaping step for shaping the glass sheet on the shaping support, wherein during step (iv) at least one (a first) portion of the glass sheet is deliberately cooled.

In prior art methods of shaping a glass sheet, when a glass sheet is shaped on a shaping support there may be natural cooling because of contact of the glass sheet with the shaping support. The deliberate cooling of the present invention during the shaping step is in addition to any inherent or natural cooling during the shaping step (iv). The cooling step that is started during the shaping step (iv) may finish at the same time as the shaping step, or may continue after the shaping step (iv) has been completed.

By deliberately cooling the first portion of the glass sheet, a cooling step is begun during step (iv) to deliberately cool the first portion of the glass sheet. As explained above, the cooling step that is begun during step (iv) is in addition to any inherent or natural cooling during the shaping step (iv). The cooling step may begin at the same time that the shaping step begins.

It has been found that by deliberately cooling the first portion of the glass sheet during the shaping step, instead of after the shaping step, the compressive surface stress in the first portion of the glass sheet may be increased above that produced by deliberately cooling after the glass sheet has been shaped. The compressive surface stress increase in the first portion of the glass sheet by deliberately cooling during the shaping step is the increase in surface compressive stress above that when there is no deliberate cooling of the first portion of the glass sheet. For example, if carrying out steps (i)-(iv) above produces a surface compressive stress of C1 in the first portion of the glass sheet, by deliberately cooling the first portion of the glass sheet during step (iv) a surface compressive stress of C2 is produced in the first portion of the glass sheet, wherein C2>C1. Surface compression (or compressive) stress measurements may be made using techniques known to a person skilled in the art, for example using a Strainoptics Laser GASP-CS (http://www.strainoptics.com/files/Laser %20GASP-CS %20Quick-Start %20 (English).pdf). Such equipment is available from Strainoptics, Inc., 108 W. Montgomery Avenue, North Wales, PA 19454 USA.

The degree of cooling may be determined by measuring the temperature of the deliberately cooled first portion with a thermocouple or optical pyrometer. It is preferred however to measure the surface compressive stress in the final cooled shaped glass sheet to determine the cooling conditions during step (iv) required to achieve a desired surface compressive stress in the first portion of the final cooled shaped glass.

The shaping support has a shaping surface for contacting the first major surface of the glass sheet.

During step (iii) a first contact portion of the first major surface of the glass sheet is in contact with a first portion of the shaping surface of the shaping support. It is preferred that during step (iv) the first contact portion of the first major surface of the glass sheet does not move relative to the first portion of the shaping surface of the shaping support.

Preferably the shaping support has at least one (a first) shaping rail for contacting the first major surface of the glass sheet. The first shaping rail may be straight or curved. The first shaping rail has a shaping surface for contacting the first major surface of the glass sheet. The shaping surface of the first shaping rail may be continuous or comprise a plurality of projections that define the shaping surface of the first shaping rail.

Preferably the shaping support is configured to contact the glass sheet at a peripheral region of the glass sheet.

Preferably the shaping support is configured as a ring mould to contact the glass sheet at a peripheral region of the glass sheet. A ring mould has an upper shaping surface for supporting a glass sheet thereon. Inboard of the shaping surface of the ring mould the ring mould does not contact the glass sheet. A ring mould comprises one or more shaping rail.

Preferably the first portion of the glass sheet is a portion of the first major surface of the glass sheet.

Preferably the first portion of the glass sheet is a portion of the first major surface of the glass sheet and not a portion of the second major surface of the glass sheet.

Preferably the first portion of the glass sheet is a peripheral portion of the glass sheet. Preferably the peripheral portion extends up to a distance DP from a peripheral edge of the glass sheet wherein the distance DP is preferably between 100 mm and 400 mm, for example the distance may be 100 mm or 150 mm or 200 mm or 250 mm or 300 mm or 350 mm or 400 mm.

Preferably the first portion of the glass sheet extends around the entire periphery of the glass sheet.

Preferably the first portion of the glass sheet is deliberately cooled by directing at least one (a first) jet of fluid towards the first portion of the glass sheet. Preferably the first jet of fluid comprises air, more preferably compressed air.

Preferably a plurality of jets of fluid are directed at the first portion of the glass sheet.

Preferably the first portion of the glass sheet is a peripheral portion of the first major surface of the glass sheet and the first portion is deliberately cooled by directing at least one (a first) jet of fluid towards the peripheral portion of the first major surface of the glass sheet. In such embodiments, preferably the first jet of fluid comprises air, more preferably compressed air.

When the deliberate cooling is achieved by directing at least one jet of fluid, preferably air, towards the first portion of the glass sheet, preferably the or each jet of fluid is at a temperature and/or pressure sufficient to achieve the desired amount of cooling.

Suitably following step (iv) the method includes a cooling step after step (iv) for reducing the temperature of the shaped glass to below 100° C., typically to ambient temperatures i.e. room temperature. The cooling step may comprise a thermally toughening step and/or an annealing step. Preferably the cooling step does not thermally toughen the shaped glass sheet. Following such a cooling step a surface compressive stress measurement may be made.

In some embodiments a shaping member is provided before step (iv), and during step (iv) the glass sheet is shaped by pressing the glass sheet between the shaping support and the shaping member. Suitably the shaping member is provided at the same time as the shaping support is provided, although the shaping member may be provided before or after step (i).

Preferably the glass sheet is shaped between the shaping member and the shaping support by moving at least one of the shaping support and the shaping member towards the other to press the glass sheet between the shaping support and the shaping member.

It will be readily apparent that when a shaping member is provided, to allow the glass sheet to be positioned on the shaping support during step (iii) the shaping member is sufficiently spaced apart from the shaping support.

In embodiments where a shaping member is provided and during step (iv) the glass sheet is shaped by pressing the glass sheet between the shaping support and the shaping member, preferably the shaping member is a full surface shaping member having a shaping surface for contacting the second major surface of the glass sheets during step (iv). A full surface shaping member comprises a shaping surface that is fixed in relation to the shaping support such that a full surface shaping member is not a conformable shaping member. Often in the prior art a full surface shaping member is known as a rigid mould or a rigid full surface shaping member because the shaping surface of the full surface shaping member is rigid i.e. either arranged in a convex or concave configuration but not changeable therefrom.

When a full surface shaping member is used during step (iv), it is preferred to deliberately cool a first portion of the first major surface of the glass sheet. As is readily apparent, a full surface shaping member will be in shaping contact with the second major surface of the glass sheet so it will be difficult to deliberately cool certain portions of the second major surface of the glass sheet during the shaping step because such portions are not accessible. However it is within the scope of the present invention to provide a shaping member with at least one opening in the shaping surface thereof, through which a cooling fluid may be directed to deliberately cool a portion of the second major surface of the glass sheet during the shaping step (iv) if required.

Preferably the shaping member comprises at least two (a first and a second) movable shaping members. The first movable shaping member is movable relative to the second movable shaping member. Suitable shaping members having at least two movable shaping members are described in U.S. Pat. No. 5,122,177, WO2012/166365A1 and US2015/0007612A1.

In embodiments where a shaping member is provided and during step (iv) the glass sheet is shaped by pressing the glass sheet between the shaping support and the shaping member, there are other preferred features.

Suitably the glass sheet is not rolled between the shaping support and the shaping member.

Preferably the shaping support and/or the shaping member is not a conformable pressing element. A conformable pressing element has at least one surface for glass contact therewith that is a pressurised surface, for example a pressurised flexible membrane.

Preferably the shaping member and the shaping support each have a rigid shaping surface.

Preferably the shaping member is disposed vertically relative to the shaping support.

Preferably the shaping member and the shaping support lie along an axis for bending, wherein prior to step (iv) the shaping member is spaced part from the shaping support, and upon moving at least one of the shaping member and the shaping support along the axis for bending towards the other such that the separation thereof decreases, a glass sheet supported on the shaping support is press bent to a desired curvature between the shaping support and the shaping member. It is preferred that the shaping member moves relative to the shaping support in a direction that is parallel to, or substantially parallel to, the axis for bending. In particular a glass sheet supported on the shaping support is not rolled against the shaping member.

Preferably the shaping support has a concave shaping surface and the shaping member has a convex shaping surface that is complementary to the concave shaping surface of the shaping support.

Preferably the shaping member has a convex shaping surface for contacting the second major surface of the glass sheet when supported on the shaping support.

Preferably shaping member has a shaping surface having one or more opening therein. At least one of the one or more opening in the shaping surface of the shaping member may be in fluid communication with a low pressure source, such as a vacuum source.

Preferably the shaping member is provided with a protective cover such that the protective cover of the shaping member contacts the glass sheet during step (iv). When the shaping member comprises a protective cover, shaping contact of the shaping member with the glass sheet is made via the protective cover. Preferably the protective cover of the shaping member comprises a cloth made of, for example, stainless steel, fibre glass, poly-phenyleneterephthalamide fibres (e.g. Kevlar™), materials blended Kevlar™, polybenzoxale (PBO) fibres containing graphite (e.g. Zylon™), or various weaves of these fibres.

In other embodiments where a shaping member is provided and during step (iv) the glass sheet is shaped by pressing the glass sheet between the shaping support and the shaping member, it is preferred that the shaping support is a full surface shaping support having a shaping surface for contacting the first major surface of the glass sheet and the shaping member comprises at least one shaping rail having a shaping rail for contacting the second major surface of the glass sheet.

In some embodiments during step (iv) the glass sheet is shaped by allowing the heat softened glass sheet to sag under the influence of gravity.

In some embodiments of the first aspect of the present invention the deliberate cooling is provided by a heat exchange device, configured to extract heat from the first portion of the glass sheet. Preferably the heat exchange device does not make direct contact with the portion of the glass sheet.

Preferably the heat exchange device comprises a cooling circuit comprising at least one (a first) pipe for carrying a cooling fluid.

Preferably the heat exchange device comprises a cover. Preferably the cover for the heat exchange device comprises a cloth made of, for example, stainless steel, fibre glass, poly-phenyleneterephthalamide fibres (e.g. Kevlar™), materials blended Kevlar™, polybenzoxale (PBO) fibres containing graphite (e.g. Zylon™), or various weaves of these fibres.

In some embodiments a second portion of the glass sheet is deliberately cooled during step (iv).

The second portion of the glass sheet may be a portion of the first major surface or the second major surface of the glass sheet.

The second portion of the glass sheet may be a peripheral portion of the first major surface of the glass sheet.

Preferably the first portion is a portion of the first major surface of the glass sheet and the second portion is a portion of the first major surface of the glass sheet.

Preferably the first portion of the glass sheet and the second portion of the glass sheet are isolated regions of the glass sheet. The regions of the glass sheet are isolated when there is at least a portion of the glass sheet between the first and second portions thereof that is not being deliberately cooled during step (iv).

Preferably the second portion of the glass sheet is deliberately cooled when the first portion of the glass sheet is being deliberately cooled.

Preferably the second portion of the glass sheet is deliberately cooled using the same cooling means as used for deliberately cooling the first portion of the glass sheet. Suitably the second portion of the glass sheet is deliberately cooled by directing at least one (a first) jet of fluid is towards the second portion of the glass sheet, preferably wherein the first jet of fluid that is direction towards the second portion of the glass sheet comprises air, in particular compressed air.

For the avoidance of doubt, in a preferred embodiment of the first aspect of the present invention there is provided a method of shaping a glass sheet, the glass sheet having a first major surface and a second opposing major surface, the method comprising the steps: (i) providing a shaping member and providing a shaping support for supporting the glass sheet thereon; (ii) a heating step for heating the glass sheet to a temperature suitable for shaping; (iii) a positioning step for positioning the glass sheet on the shaping support such that the first major surface of the glass sheet is in contact with the shaping support; and (iv) a shaping step for shaping the glass sheet on the shaping support by making shaping contact between the shaping member and the second major surface of the glass sheet, thereby shaping the glass sheet between the shaping support and the shaping member, wherein during step (iv) at least one portion of the first major surface of the glass sheet is deliberately cooled by directing at least one jet of fluid. preferably air, onto the first portion of the first major surface, further wherein during the shaping step (iv) there is no jet of fluid, preferably air, directed onto the second major surface of the glass sheet when the glass sheet is on the shaping support.

Other embodiments of the first aspect of the present invention have other preferable features.

In embodiments where the first portion is a peripheral portion of the glass sheet, in particular a peripheral portion of the first major surface of the glass sheet, and wherein following step (iv) the method includes an annealing step or a cooling step for reducing the temperature of the shaped glass to below 100° C., typically to ambient temperatures i.e. room temperature, preferably following the annealing step or cooling step there is a surface compressive stress in the peripheral portion of less than or equal to CS MPa, where CS is 40, or 30, or 25, or 20, or 15 i.e. the surface compressive stress in the peripheral portion is less than or equal to 40 MPa, or the surface compressive stress in the peripheral portion is less than or equal to 30 MPa or the surface compressive stress in the peripheral portion is less than or equal to 25 MPa. or the surface compressive stress in the peripheral portion is less than or equal to 20 MPa, or the surface compressive stress in the peripheral portion is less than or equal to 15 MPa.

In embodiments where the first portion is a peripheral portion of the glass sheet, in particular a peripheral portion of the first major surface of the glass sheet, and wherein following step (iv) the method includes an annealing step or a cooling step for reducing the temperature of the shaped glass to below 100° C., typically to ambient temperatures i.e. room temperature, preferably following the annealing step or the cooling step the surface compressive stress in the peripheral portion is increased between 5 MPa and 25 MPa, preferably between 5 MPa and 20 MPa, more preferably between 5 MPa and 15 MPa, compared to the surface compressive stress in the peripheral portion when there is no deliberate cooling during step (iv). For example in such embodiments the deliberate cooling may comprise directing at least one jet of air towards the peripheral portion of the glass sheet, and when no air is directed towards the peripheral portion the surface compressive stress in the peripheral portion is a baseline level, and when air is directed towards the peripheral portion during step (iv) the surface compressive stress in the peripheral portion is increased by between 5 MPa and 25 MPa compared to the baseline level.

In embodiments when the first portion is a peripheral portion of the glass sheet, in particular a peripheral portion of the first major surface of the glass sheet, following step (iv) the method preferably includes a thermally toughening for reducing the temperature of the shaped glass to below 100° C., typically to ambient temperatures i.e. room temperature, such that following the thermally toughening step there is a surface compressive stress (CS3) in the peripheral portion of at least 50 MPa, or at least 55 MPa, or at least 60 MPa, or at least 65 MPa, or at least 70 MPa, or at least 75 MPa or at least 80 MPa, or at least 85 MPa, or at least 90 MPa. Preferably CS3 is less than 200 MPa.

Other embodiments of the first aspect of the present invention have other preferable features.

Preferably the shaping support comprises heating means for heating the shaping support. By having heating means the shaping support is able to be set at a suitable temperature for bending.

Preferably following step (iv), the shaped glass sheet is suitably heat treated or cooled to reduce the temperature to ambient temperature, typically to a temperature below 50° C. and above 0° C.

Preferably following step (iv) there is a surface compressive stress in the first portion of less than or equal to CS MPa, where CS is 40, or 30, or 25, or 20, or 15.

Preferably following step (iv) there is a surface compressive stress in the first portion of greater than or equal to CS1 MPa, where CS1 is 0, or 0.5, or 1, or 2, or 3, or 4, or 5.

Preferably following step (iv) there is a surface compressive stress in the first portion, and the surface compressive stress in the first portion is increased by between 5 MPa and 25 MPa, preferably between 5 MPa and 20 MPa, more preferably between 5 MPa and 15 MPa, compared to the surface compressive stress in the first portion when there is no deliberate cooling during step (iv). For the avoidance of doubt, when carrying out a method in accordance with the first aspect of the present invention and during step (iv) there is no deliberate cooling of a first portion of the glass sheet i.e. there is no air directed towards a first portion of the first major surface of the glass sheet, the first portion of the glass sheet has a baseline surface compressive stress. When another identical glass sheet is shaped in accordance with the first aspect of the present invention, the surface compressive stress in the first portion of the glass sheet is greater than the baseline surface compressive stress and it is preferred that the increase is between 5 MPa and 25 MPa, preferably between 5 MPa and 20 MPa, more preferably between 5 MPa and 15 MPa.

Preferably following step (iv) the shaped glass sheet is not thermally toughened or thermally tempered.

Preferably following step (iv) there is a surface compressive stress (CS2) in the first portion of at least 50 MPa, or at least 55 MPa, or at least 60 MPa, or at least 65 MPa, or at least 70 MPa, or at least 75 MPa or at least 80 MPa, or at least 85 MPa, or at least 90 MPa, and further preferably wherein CS2 is less than 200 MPa.

The shaping step (iv) has a duration from t1 to t2, and the deliberate cooling of the first portion of the glass sheet has a duration from t3 to t4.

Preferably the duration of the deliberate cooling of the first portion of the glass sheet is the same as the duration of the shaping step (iv). That is, it is preferred that t2−t1=t4−t3.

Preferably the deliberate cooling of the first portion of the glass sheet begins at the same time as the shaping step (iv) begins. That is, it is preferred that t1=t3.

Preferably the deliberate cooling begins after the shaping step begins but before the shaping step has ended. That is, it is preferred that t3>t1 and t3<t4.

Preferably the deliberate cooling of the first portion of the glass sheet is continued after the glass has been shaped. That is, it is preferred that t4>t2.

Preferably the glass sheet is a soda-lime-silica glass composition. A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2% and $Fe_2O_3$ 0.005-2%. The glass composition may also contain other additives, for example, refining aids, which would normally be present in an amount of up to 2%. The transmitted glass colour may be measured in terms of a recognised standard such as BS EN410.

Preferably the glass sheet has a thickness between 1 mm and 10 mm, more preferably between 1.2 mm and 4 mm, even more preferably between 1.2 mm and 2.4 mm.

Preferably the glass sheet has a thickness between 1.5 mm and 2.5 mm, more preferably between 1.6 mm and 2.3 mm.

Preferably following step (iv) the shaped glass sheet is used as part of a glazing for a vehicle, in particular an automotive vehicle. Suitably the vehicle glazing is a windscreen, sunroof, rear window or side window.

Preferably during step (ii) the glass is heated to a temperature between 580° C. and 680° C.

Preferably during step (ii) the glass sheet is uniformly heated.

Preferably the shaping support is provided with a protective cover such that in step (iii) the protective cover of the shaping support contacts the glass sheet. When the shaping support comprises a protective cover, shaping contact of the shaping support with the glass sheet is made via the protective cover of the shaping support. Preferably the protective cover of the shaping support comprises a cloth made of, for example, stainless steel, fibre glass, poly-phenyleneterephthalamide fibres (e.g. Kevlar™), materials blended Kevlar™, polybenzoxale (PBO) fibres containing graphite (e.g. Zylon™), or various weaves of these fibres.

In some embodiments, following step (iv) the shaped glass sheet is subsequently used as a first glass ply in a laminated glazing, the laminated glazing comprising the first glass ply joined to a second glass ply by means of at least one sheet of adhesive interlayer material.

Preferably the second glass ply is shaped with a different shaping process to the shaping process used to shape the first glass ply.

Preferably the first glass ply is an outer ply in the laminated glazing, such that the first portion of the first glass ply that was deliberately cooled during step (iv) is part of surface 1 of the laminated glazing. Preferably surface 1 of the laminated glazing has a convex surface.

Preferably the first glass ply has a soda-lime-silica composition and the second glass ply has been chemically strengthened prior to being joined to the first glass ply.

Preferably the second glass ply has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the second glass ply has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Preferably the second glass ply has an alkali aluminosilicate glass composition, preferably wherein the alkali aluminosilicate glass composition includes at least about 6 wt % aluminium oxide.

Preferably the second glass ply is thinner than the first glass ply.

Preferably the second glass ply has a thickness between 0.5 mm and 2.1 mm.

Preferably the first glass ply is the outer ply in the laminated glazing, such that the first portion of the first glass ply that was deliberately cooled is part of surface 1 of the laminated glazing. Using conventional nomenclature, surface 1 of the laminated glazing is the outermost surface in the laminated glazing and is the first surface a ray of sunlight strikes when the laminated glazing is in an installed position, for example when installed as a windscreen in a vehicle.

Preferably the at least one ply of adhesive interlayer material comprises polyvinyl butyral (PVB).

Preferably the at least one ply of adhesive interlayer material comprises acoustic modified PVB.

Preferably the at least one ply of adhesive interlayer material comprises a copolymer of ethylene, such as ethylene vinyl acetate (EVA).

Preferably the at least one ply of adhesive interlayer material comprises polyurethane, in particular a thermoplastic polyurethane (TPU).

In embodiments wherein following step (iv) the shaped glass sheet is subsequently used as a first glass ply in a laminated glazing, the laminated glazing comprising the first glass ply joined to a second glass ply by means of at least one sheet of adhesive interlayer material, for the avoidance of doubt, in such embodiments, following step (iv) the shaped glass sheet is laminated to at least another glass sheet using an interlayer structure comprising at least one sheet of adhesive interlayer material Preferably the interlayer material is polyvinyl butyral, ethylene vinyl acetate copolymer, polyurethane, polycarbonate, poly vinyl chloride or a copolymer of ethylene and methacrylic acid.

Preferably the at least another glass sheet is shaped with a different shaping process to the shaping process used to shape the shaped glass sheet.

Preferably the shaped glass sheet is an outer ply in the laminated glazing, such that the first portion of the shaped glass sheet that was deliberately cooled during step (iv) is part of surface 1 of the laminated glazing.

Preferably the at least another glass sheet is an outer ply in the laminated glazing.

Preferably the shaped glass sheet and/or the at least another glass sheet has a soda-lime-silica composition.

Preferably the at least another glass sheet has been chemically strengthened prior to being laminated to the shaped glass sheet i.e. prior to being joined to the shaped glass sheet via the interlayer structure.

Preferably the shaped glass sheet has a soda-lime-silica composition and the at least another glass sheet has been chemically strengthened prior to being laminated to the shaped glass sheet. Preferably the at least another glass sheet has an alkali aluminosilicate glass composition, more preferably wherein the alkali aluminosilicate glass composition includes at least about 6 wt % aluminium oxide.

Preferably the at least another glass sheet is thinner than the shaped glass sheet.

Preferably the at least another glass sheet has a thickness between 0.5 mm and 2.1 mm, more preferably between 0.5 mm and 1.0 mm.

From a second aspect the present invention provides an apparatus for shaping a glass sheet, the apparatus comprising a shaping support for supporting a glass sheet thereon, a shaping member for shaping the glass sheet by pressing the glass sheet between the shaping member and the shaping support, and an assembly of one or more nozzles for directing a fluid against a major surface of the glass sheet when the glass sheet is being pressed between the shaping member and the shaping support.

Preferably the apparatus comprises control means to actuate the flow of fluid to at least one of the one or more nozzles to carry out the method according to the first aspect of the present invention.

Preferably at least one nozzle is a slot nozzle.

Preferably at least one nozzle comprises a tubular portion.

Preferably the assembly comprises a tubular portion having an inlet, an outlet, and a wall, there being at least one hole in the wall such that when a fluid passes between the inlet and the outlet, fluid is emitted from the hole in the wall of the tubular portion of the assembly.

Preferably at least one of the nozzles is arranged to direct the fluid towards the major surface of the glass sheet in contact with the shaping support when the glass sheet is pressed between the shaping support and the shaping member.

Preferably the assembly is configured to direct the fluid towards the major surface of the glass sheet in contact with the shaping support when the glass sheet is pressed between the shaping support and the shaping member and the assembly is configured not to direct the fluid towards the major surface of the glass sheet not in contact with the shaping support when the glass sheet is pressed between the shaping support and the shaping member. For the avoidance of doubt, in this preferred embodiment the glass sheet to be shaped has a first major surface and a second opposing major surface. When the glass sheet is pressed between the shaping support and the shaping member, the first major surface of the glass sheet is in contact with the shaping support and the second major surface of the glass sheet is in contact with the shaping member. The assembly is configured such that during said pressing, fluid may only be directed towards the first major surface of the glass sheet.

Other embodiments of the second aspect of the present invention have other preferable features.

Preferably the shaping support is a ring mould.

Preferably the shaping member is a full surface mould.

Preferably the shaping member comprises at least two mould members, each being movable relative to one another.

Preferably the shaping support has a concave shaping surface and the shaping member has a convex shaping surface. Preferably the concave shaping surface of the shaping support is complementary with the convex shaping surface of the shaping member.

Preferably the shaping member and/or shaping support is provided with a protective cover such that the respective protective cover makes shaping contact with the glass sheet when the glass sheet is being pressed between the shaping member and the shaping support. Preferably the protective cover comprises a cloth made of, for example, stainless steel, fibre glass, poly-phenyleneterephthalamide fibres (e.g. Kevlar™), materials blended Kevlar™, polybenzoxale (PBO) fibres containing graphite (e.g. Zylon™), or various weaves of these fibres.

From a third aspect the present invention provides a method of making a laminated glazing, the laminated glazing comprising a first glass ply and a second glass ply with at least one (a first) ply of adhesive interlayer material therebetween, the method comprising shaping at least one of the first and second glass plies using a method according to the first aspect of the present invention.

The first glass ply is joined to the second glass ply by means of at least the first ply of adhesive interlayer material. Any suitable lamination process may be used to join the first glass ply to the second glass ply by means of at least the first ply of adhesive interlayer material.

Preferably the first glass ply is shaped according to the first aspect of the present invention and the second glass ply is shaped with a different shaping process.

Preferably the at least one ply of adhesive interlayer material comprises polyvinyl butyral (PVB).

Preferably the at least one ply of adhesive interlayer material comprises acoustic modified PVB.

Preferably the at least one ply of adhesive interlayer material comprises a copolymer of ethylene, such as ethylene vinyl acetate (EVA).

Preferably the at least one ply of adhesive interlayer material comprises polyurethane, in particular a thermoplastic polyurethane (TPU).

Preferably the first glass ply is a soda-lime-silica glass.

Preferably the second glass ply has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the second glass ply has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Preferably the second glass ply has an alkali aluminosilicate glass composition, preferably wherein the alkali aluminosilicate glass composition includes at least about 6 wt % aluminium oxide.

Preferably the first glass ply is bent by pressing the first glass ply between a shaping support having a shaping surface, in particular a ring mould, and a shaping member, in particular a die member having a convex shaping surface complementary with the shaping surface of the shaping support.

Preferably the second glass ply is bent using a gravity sag bending process.

Preferably the second glass ply is shaped, following which the second glass ply is chemically strengthened.

Preferably the second glass ply is thinner than the first glass ply.

Preferably the second glass ply has a thickness between 0.5 mm and 2.1 mm.

Preferably the first glass ply is the outer ply in the laminated glazing, such that the first portion of the first glass ply that was deliberately cooled is part of surface 1 of the laminated glazing. Using conventional nomenclature, surface 1 of the laminated glazing is the outermost surface in the laminated glazing and is the first surface a ray of sunlight strikes when the laminated glazing is in an installed position, for example when installed as a windscreen in a vehicle.

Embodiments of the present invention will now be described by way of example only with reference to the accompanying drawings, in which.

Figure 2:
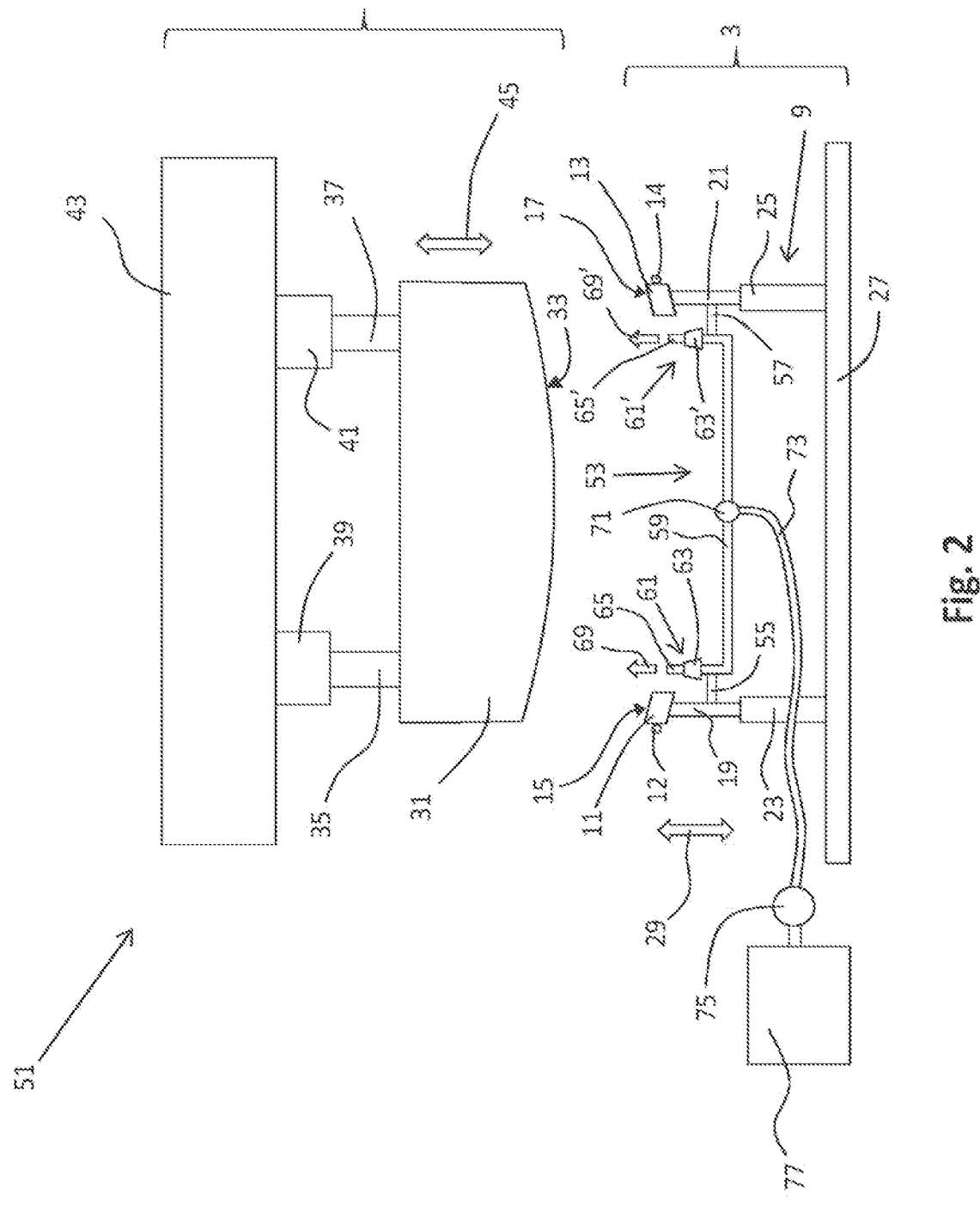
FIG. 2 shows a schematic cross-sectional representation of a press bending station for carrying out a method in accordance with the present invention, the press bending station being in a first configuration.
Figure 8:
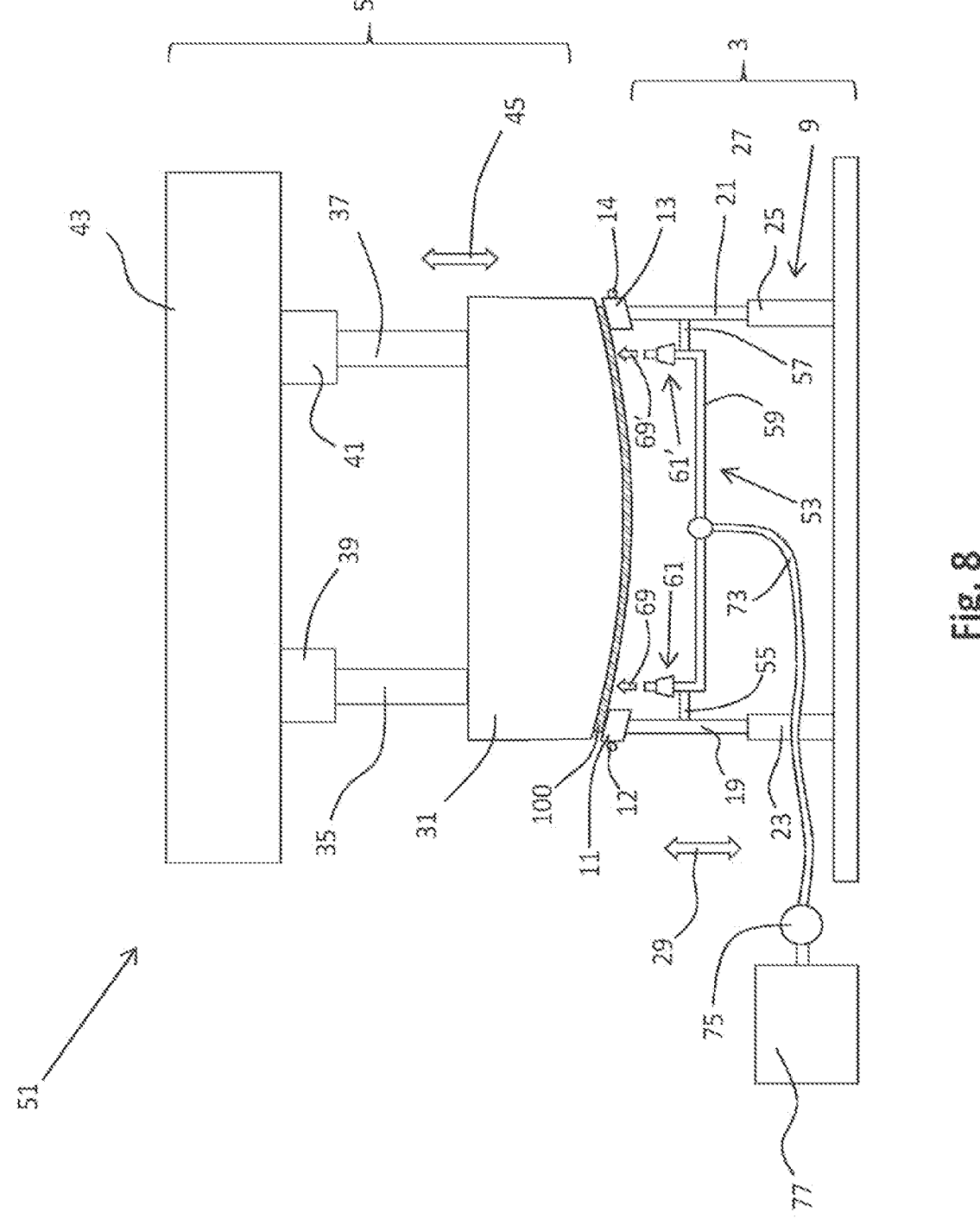
Figure 9:
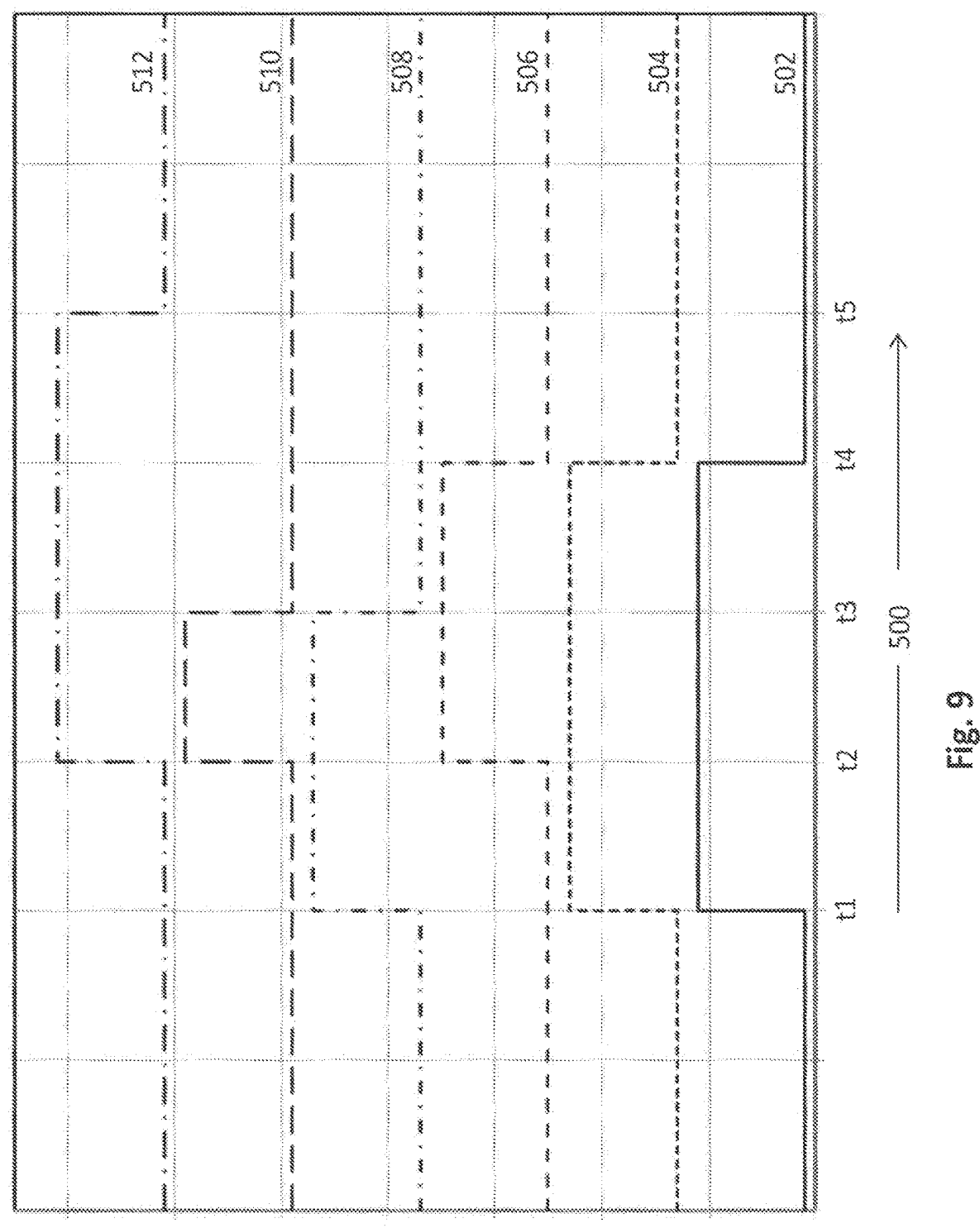
Figure 10:
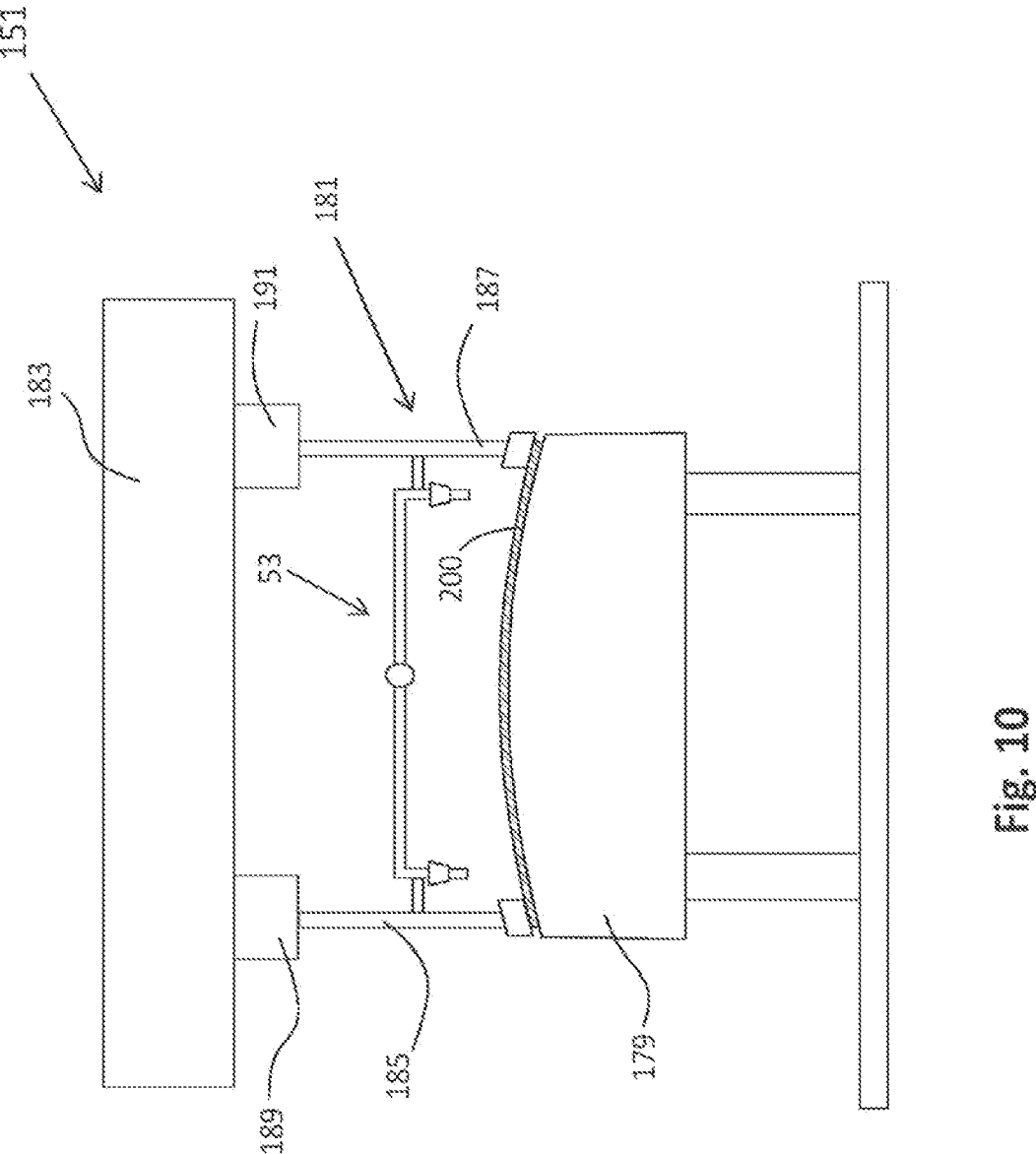
Figures 11, 12:
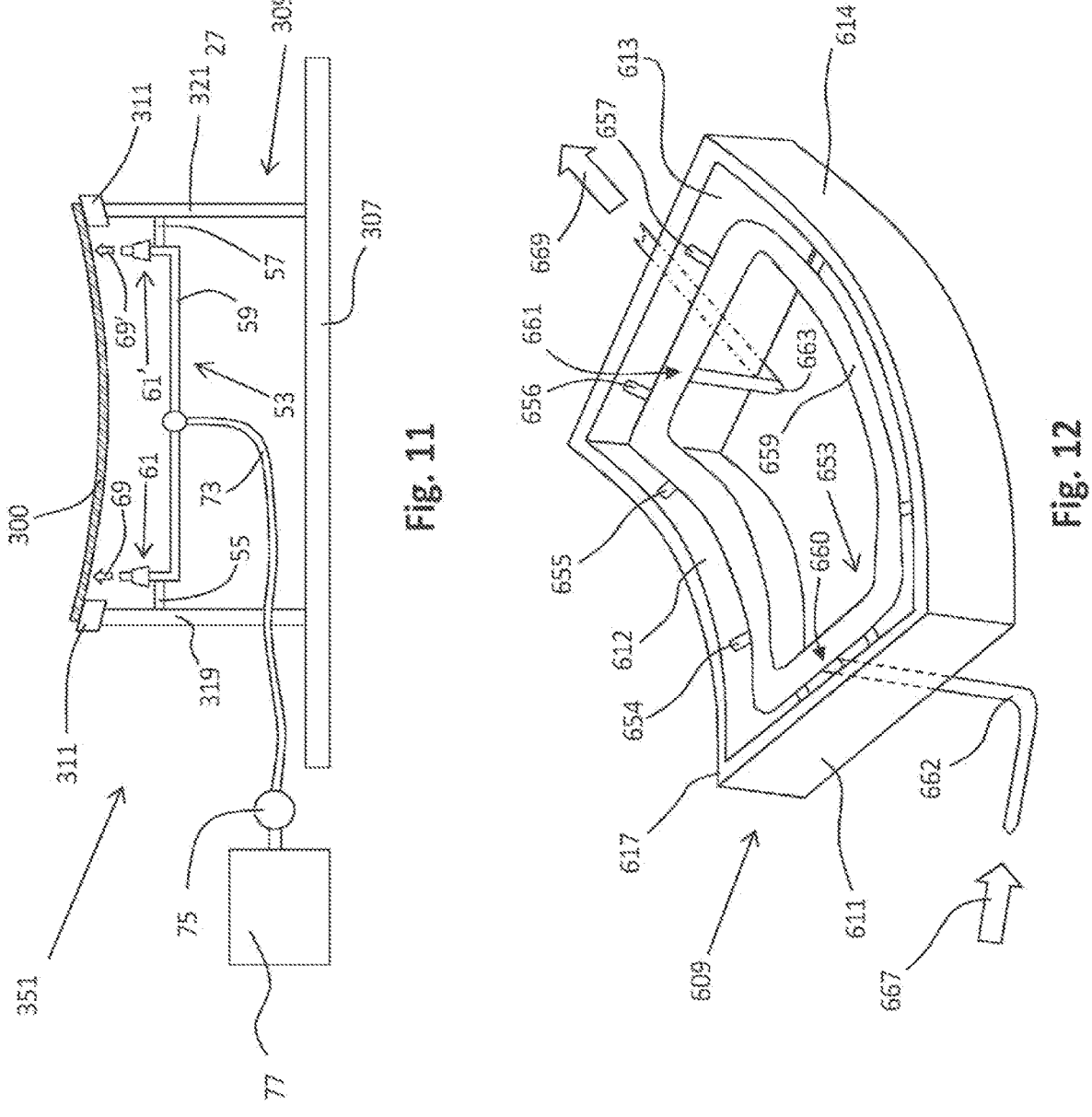
Figure 13:
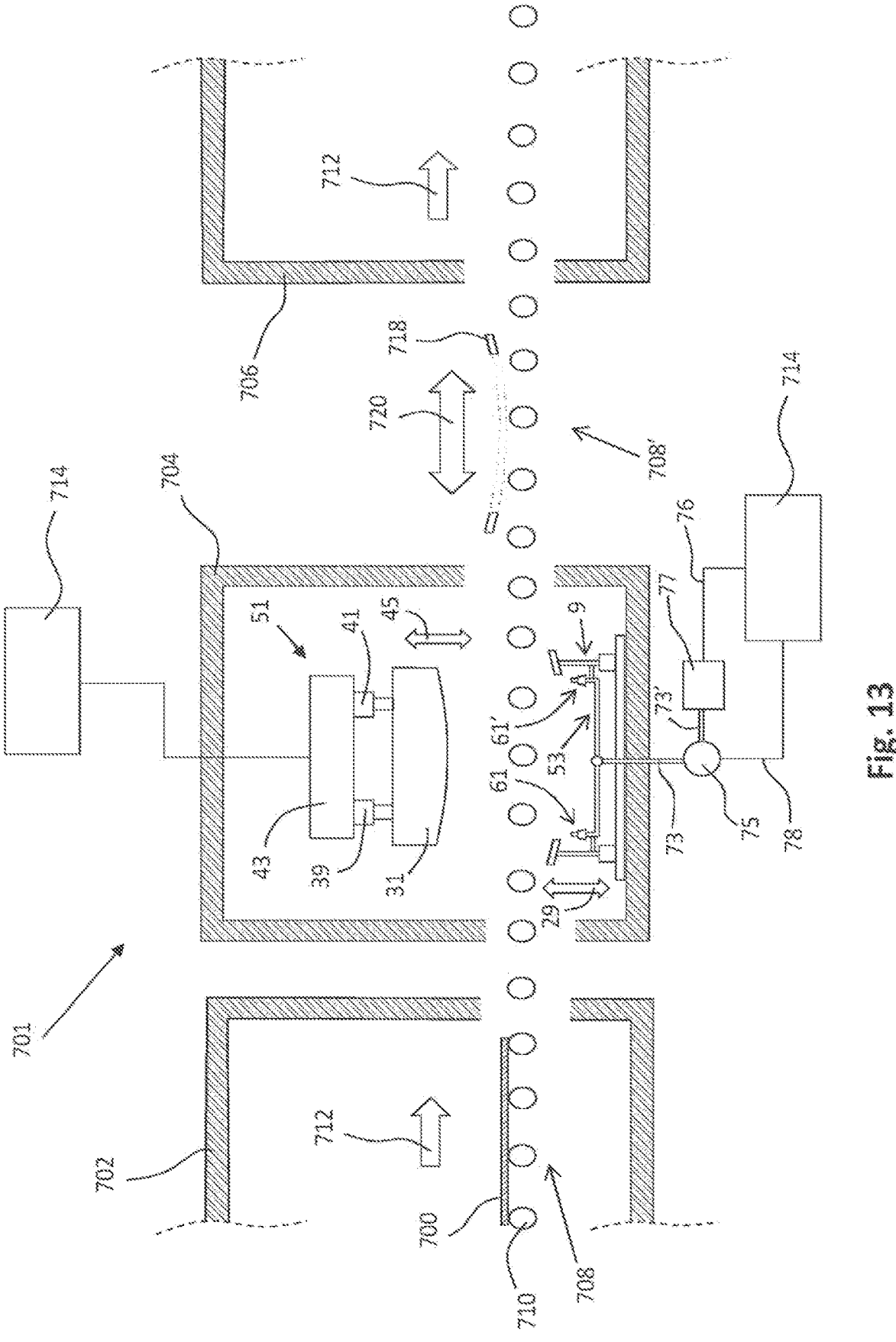

FIGS. 7*a-e* show schematic isometric representations of different nozzle arrangements;

FIG. 8 shows the press bending station of FIG. 2 in a second configuration press bending a sheet of glass;

FIG. 9 is a graph showing a shaping sequence and different air blowing sequences;

FIG. 10 shows a schematic cross-sectional representation of another press bending station for carrying out a method in accordance with the present invention;

FIG. 11 shows a schematic cross-sectional representation of a gravity bending glass mould for carrying out a method in accordance with the present invention;

FIG. 12 shows an isometric representation of a shaping ring of the type shown in FIG. 3, except instead of an array of nozzles a heat exchange device is provided inboard of and below the shaping surface of the shaping ring; and FIG. 13 shows a schematic cross-sectional representation of part of a glass bending line incorporating a press bending station of the type shown in FIG. 2.

Figure 1:
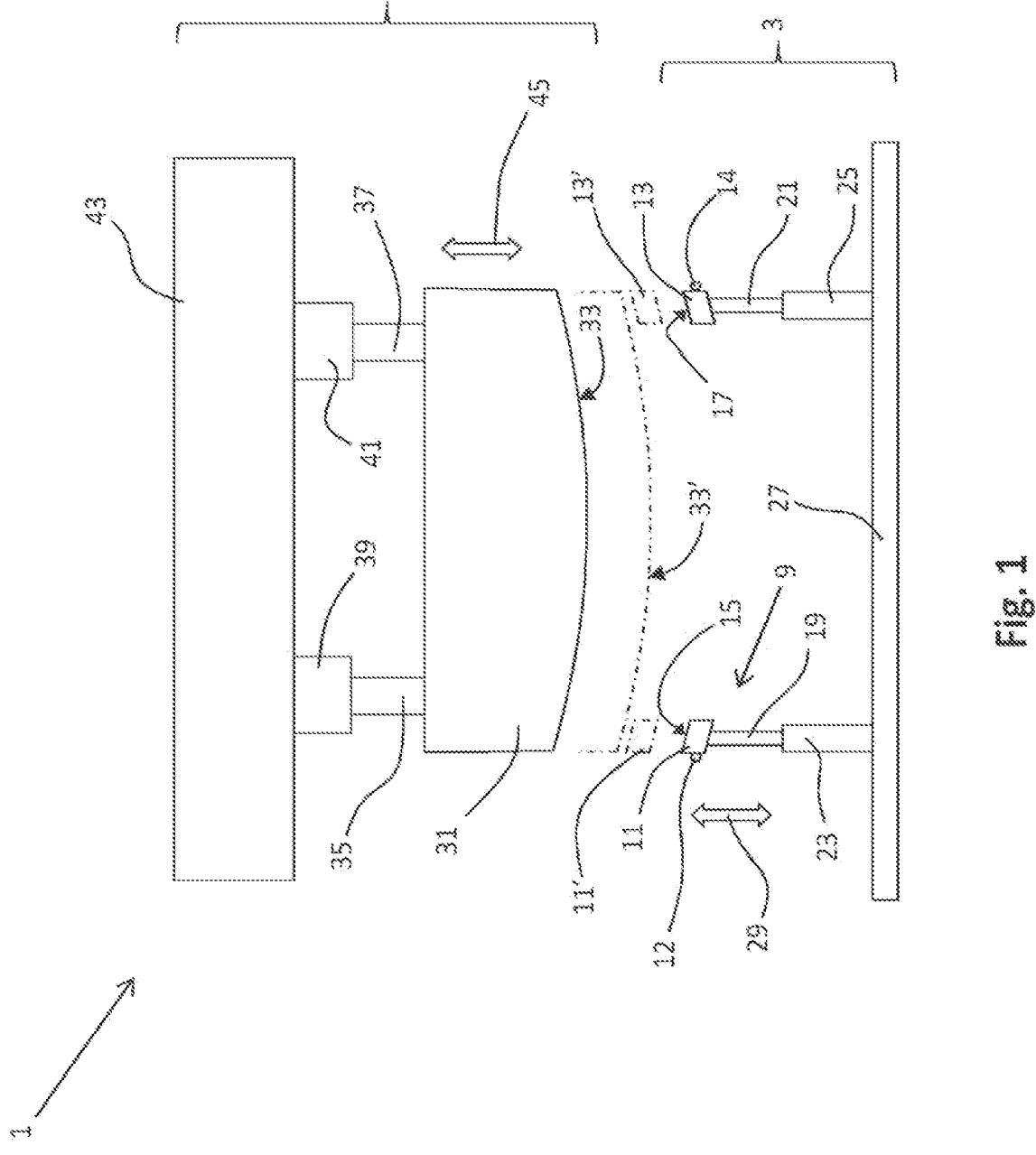
FIG. 1 shows a schematic cross-sectional representation of a known press bending station.

FIG. 1 shows a schematic cross-sectional representation of a known press bending station of the type used to press bend a glass sheet for automotive use, such a vehicle window. Such a press bending station may be used to press bend a single glass ply, or two glass plies as a nested pair.

The press bending station 1 has a lower portion 3 and an upper portion 5.

The lower portion 3 comprises a ring mould 9 having first and second upper supports 11, 13. The first upper support 11 has an upper shaping surface 15 and the second upper support 13 has an upper shaping surface 17. A glass sheet (not shown in this figure) may be supported on the upper shaping surfaces 15, 17. For the avoidance of doubt, the glass sheet has a first major surface and an opposing second major surface. When the glass sheet is supported on the upper shaping surfaces 15, 17, the first (or second) major surface contacts the shaping surfaces 15, 17.

It is preferred that the first and second upper supports 11, 13 are part of a continuous shaping rail for supporting a glass sheet thereon. As such, the shaping surfaces 15, 17 are part of the shaping surface of the continuous shaping rail.

The first upper support 11 is mounted on a first support member 19 and the second upper support 13 is mounted on a second support member 21. The first support member 19 is coupled to a first linear actuator mechanism 23 and the second support member 21 is coupled to a second linear actuator mechanism 25. Each linear actuator mechanism 23, 25 is mounted to the base member 27. The first and second linear actuator mechanisms 23, 25 may be operated to move the first and second support members 19, 21, and hence the respective first and second upper supports 11, 13 vertically in the direction of the arrow 29.

The position of the first and second upper supports 11, 13 is shown in phantom as elements 11' and 13'. In the position of elements 11', 13' the first and second upper supports are in a shaping position as will hereinafter be described.

The upper portion 5 comprises a die member 31 have a lower shaping surface 33. The lower shaping surface 33 is convex and configured to be complementary with the upper shaping surfaces 11, 13 of the lower ring mould 9.

The die member 31 is mounted to first and second die support members 35, 37. The first die support member 35 is coupled to linear actuator 39 and the second die support member 37 is coupled to linear actuator 41. The linear actuators 39, 41 are mounted to an upper gantry 43. The upper gantry is in a fixed spatial relationship with the base member 27.

Upon operation of the linear actuators 39, 41 the die member 31 is movable vertically towards (or away from) the ring mould 9 in the direction of arrow 45.

The position of the die member 31 in a shaping position is shown in phantom with the lower shaping surface being shown in the position of line 33'.

In FIG. 1, both the lower ring mould 9 and the die member 31 are movable towards each other by means of the respective linear actuators 23, 25 and 39, 41.

Usually the linear actuators 23, 25 are synchronised so that both sides of the ring mould 9 move upwards (or downwards) at the same speed. Usually the linear actuators 39, 41 are synchronised so that both sides of the die member 31 downwards (or upwards) at the same speed.

In an alternative to the example shown in FIG. 1, the ring mould 9 is static and only the die member 31 is movable relative to the ring mould. In such an embodiment the support members 19, 21 are directly mounted to the base 27, rather than being coupled to a respective linear actuator 23, 25.

In another alternative to the example shown in FIG. 1, the die member 31 is static and only the ring mould 9 is movable relative to the die member 31. In such an embodiment the die support members 35, 37 are directly mounted to the upper gantry 42, rather than being coupled to a respective linear actuator 39, 41.

Such alternative configurations of movement for the ring mould and die member are well known in the art.

When the first and second upper supports are in the position shown by elements 11' and 13' and the die member 31 has been moved downwards towards the ring mould 9 such that the shaping surface of the die member 31 is in the position indicated by line 33', a sheet of glass supported on the lower supports is able to be bent to a final desired shape between the lower ring mould 9 and the upper die member 31.

As is known in the art, the upper die member 31 may have at least one opening in the shaping surface thereof for applying a vacuum therethrough, for example as described in WO2005/033026A1.

FIG. 2 shows a schematic cross-sectional representation of a press bending station 51 of the type used carry out the present invention.

The press bending station 51 is similar to the press bending station 1 (and the same labels have been used to label the same part), with the exception of the addition of an array of nozzles 53 associated with the ring mould 9. In this example the array of nozzles 53 is in mechanical communication with the ring mould 9, as will be described in more detail below.

The array of nozzles 53 is mounted to the support members 19, 21 by means of respective elongate members 55, 57. Each elongate member 55, 57 is a steel strip providing a rigid connection between the array of nozzles 53 and the respective support member 19, 21.

Figures 3, 4:
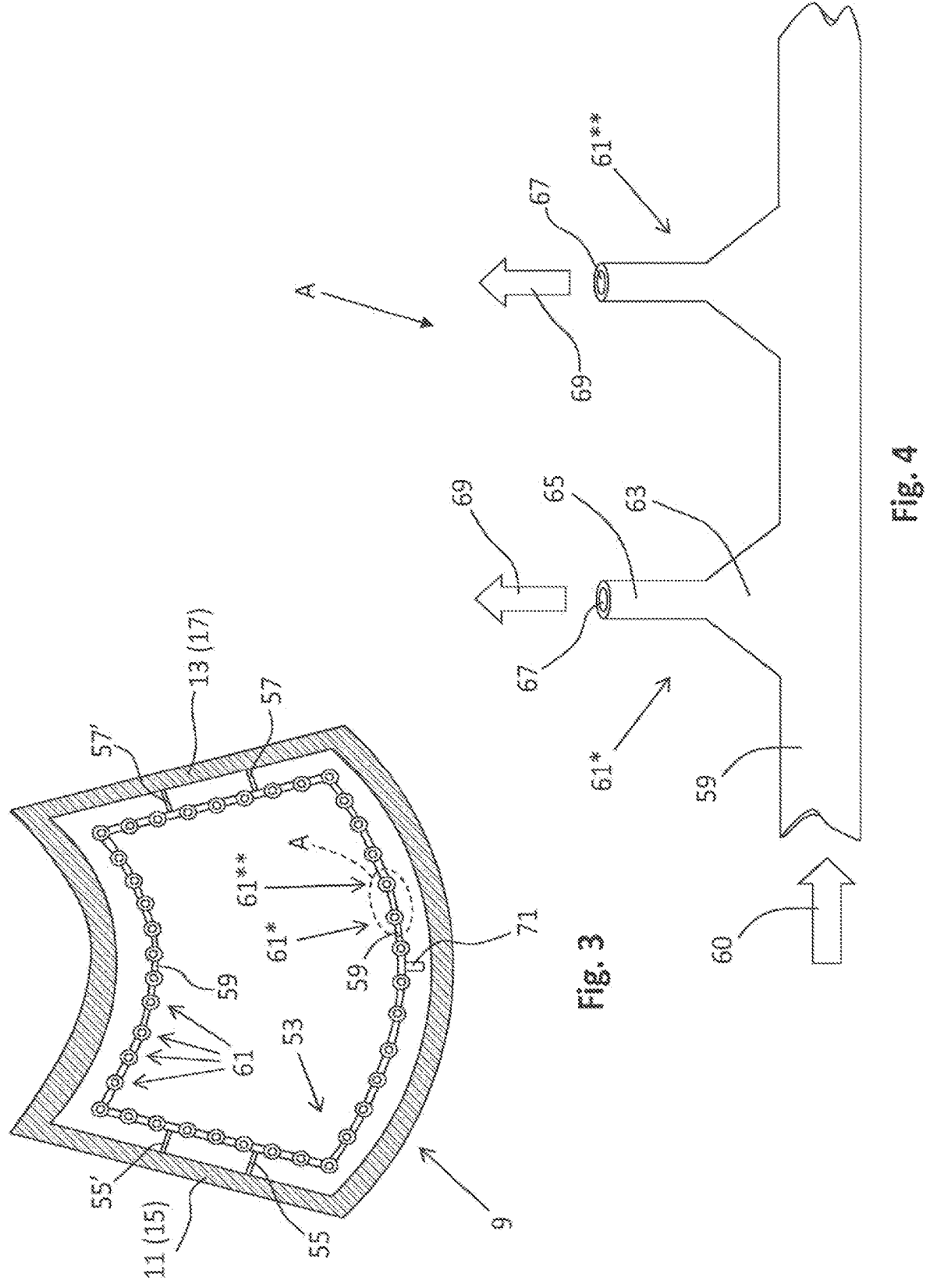
FIG. 3 shows a schematic plan view of a shaping ring for supporting a glass sheet with an array of nozzles inboard and below the shaping surface of the shaping ring.
FIG. 4 shows a schematic isometric view of a portion of an array of nozzles.

With further reference to FIGS. 2, 3 and 4, the array of nozzles 53 comprises a tubular section 59 having a plurality of nozzles 61 in fluid communication therewith. Two such nozzles 61 and 61' are shown in FIG. 2 and two such nozzles 61\* and **61 \*\* are shown in FIG. 4 (FIG. 4 showing the section A of FIG. 3**).

Each nozzle 61, 61' comprises a respective conical portion 63, 63' and a respective cylindrical portion 65, 65' having an outlet orifice. The nozzles 61 in this example are uniformly spaced along the length of the tubular section 59 but may not be. Upon directing a fluid i.e. air, in particular compressed air, through the tubular section 59 in the direction of arrow 60, a jet of fluid is emitted from each nozzle 61 via the respective orifice 67 in the direction of arrow 69. In FIG. 4, two nozzles 61\*, **61 \*\* are shown, so there are two jets of fluid in direct 69 emitted from the respective outlet orifice 67**.

In relation to FIG. 3, the array of nozzles 53 follows the internal perimeter of the lower ring mould 9 and is spaced inside the opening of the ring mould 9 and connected thereto by the elongate members 55, 55' on one side and by the elongate member 57, 57' on the other side.

In FIG. 3 there are a plurality of nozzles of the type described with reference to FIG. 4. The tubular section 59 is in the form of a continuous ring having an input section 71. The input section 71 is connected via a flexible pipe 73 to a valve 75 and the valve is in fluid communication with fluid source 77, such as a fan or compressed gas (i.e. air) cylinder. The valve 75 is controllable via control means (not shown) such as a computer, to control the flow of fluid to the array of nozzles 53 via the inlet section 71.

As better illustrated in FIG. 2, for nozzle 61 the outlet end of the cylindrical portion 65 is below the upper shaping surface 15 and for nozzle 61' the outlet end of the cylindrical portion 65' is also below the upper shaping surface 17.

When a sheet of glass is supported on the ring mould 9, jets of fluid may be directed against the surface of the sheet of glass in contact with the shaping surfaces 15, 17.

Figures 5, 6:
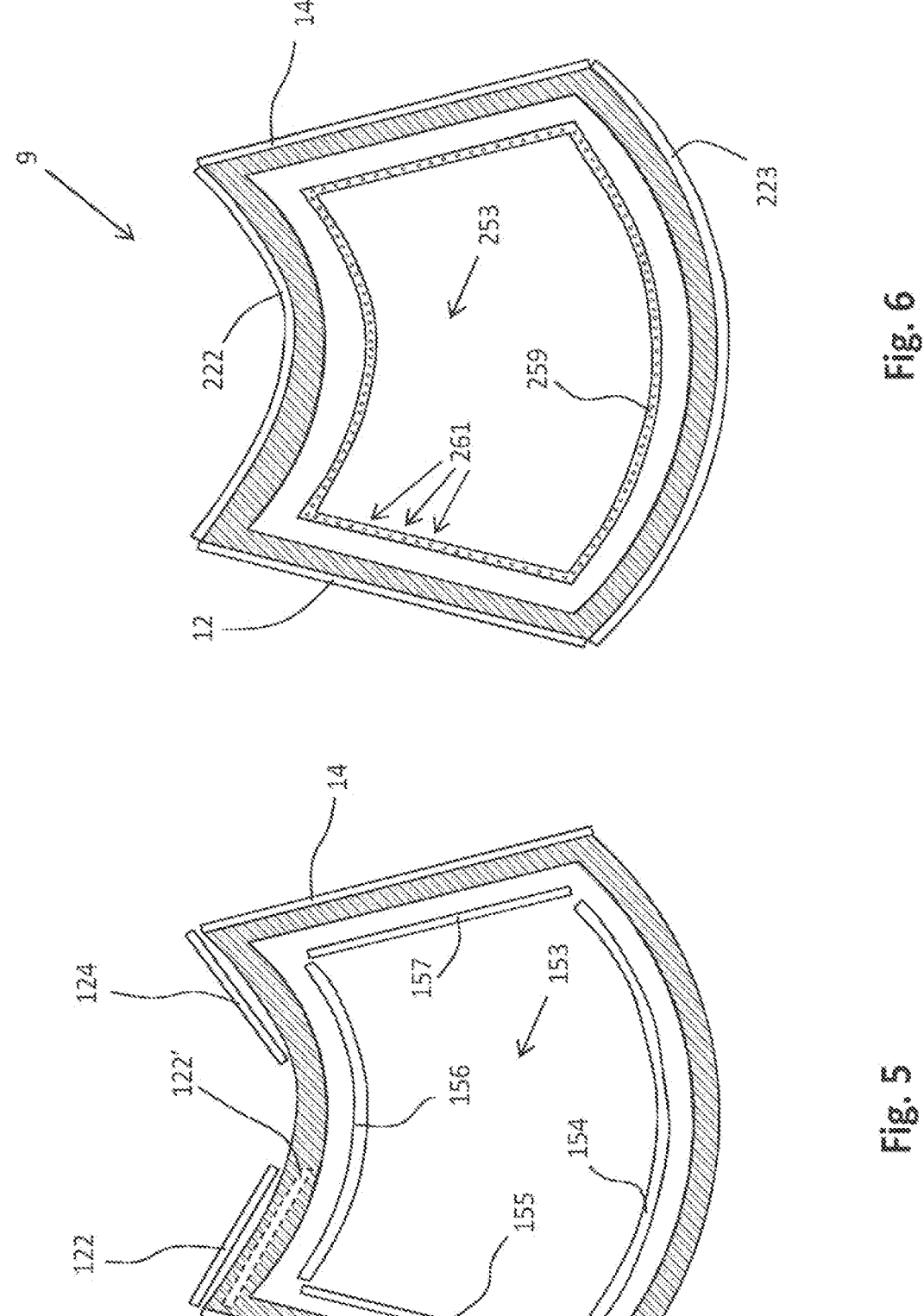
FIG. 5 shows a schematic plan view of a shaping ring for supporting a glass sheet with a different array of nozzles than in FIG. 3.
FIG. 6 shows a schematic plan view of a shaping ring for supporting a glass sheet with a different array of nozzles than in FIG. 3.

FIG. 5 shows a plan view of the ring mould 9, except in this example a different array of nozzles 153 is provided. The array of nozzles comprises four elongate slot nozzles 154, 155, 156 and 157. Each slot nozzle may be suitably connected to a source of fluid as described above. The array of nozzles 159 are located inboard the walls of the ring mould 9 and follow the shape thereof. As shown in FIG. 5, the slot nozzles 154 and 156 are curved to match the curvature of the ring mould 9 and the slot nozzles 155, 157 are straight to match the perimeter of the ring mould 9 in those regions. Linear heater elements 12, 14 are also shown adjacent an outer perimeter of the ring mould 9 to provide a heated ring mould 9. Linear heater elements 122, 124 are shown near the outer perimeter of the upper curved portion of the ring mould 9. Shown in phantom is linear heater element 122' which is positioned below the upper shaping surface of the ring mould 9, wherein such a linear heater element 122' may be instead of, or in addition to, the linear heater element 122. Similar positioning of the heater elements 12, 14 and 124 may also be adopted.

FIG. 6 shows a plan view of the ring mould 9 where in this example a different nozzle array 253 is used. The nozzle array 253 comprises a tubular ring section as described above, except instead of nozzles 61, a plurality of holes 261 are provided directly in the wall of the tubular section. This is illustrated in further illustrated in FIG. 7a which shows a portion of the tubular section 259. In this example both linear heating elements 12, 14 and curved heating elements 222, 223 are used to heat the ring mould 9. As discussed above, the heating elements may be positioned to be below the upper shaping surface of the ring mould 9.

Figures 7A, 7B, 7C, 7D, 7E:
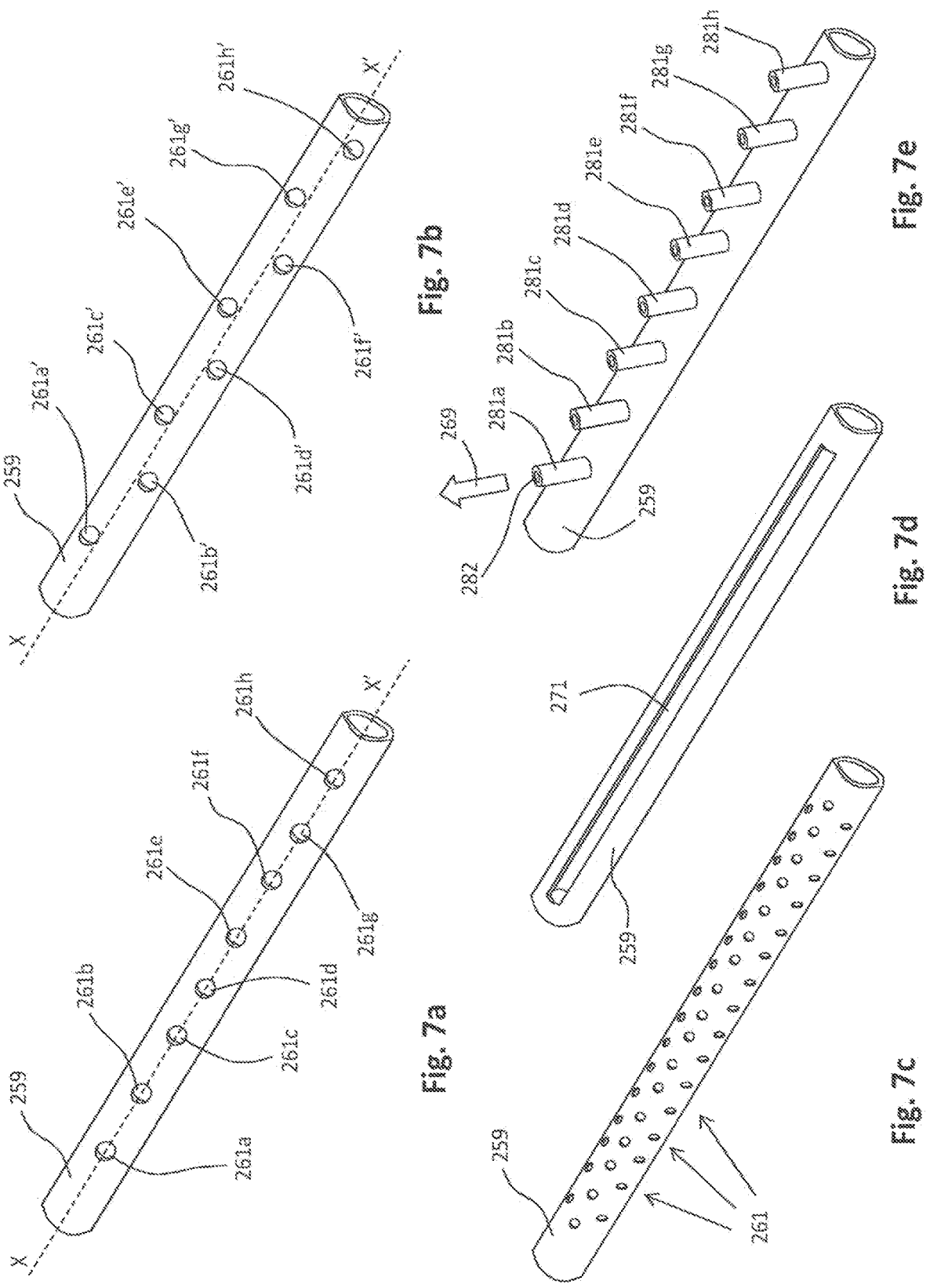

In one example the holes 261 in the tubular section 259 are arranged linearly along the length of the tubular section, as shown in FIG. 7a. FIG. 7a shows a portion of the tubular section 259. The tubular section 259 has a circular cross section along the length thereof. The line X-X' lies along the centre of the tubular section 259. There are seven circular holes 261a, 261b, 261c, 261d, 261e, 261f, 261g and 261h in the wall of the tubular section 259, with the centre of each hole 261a-h being aligned with the line X-X'. When a fluid passes through the tubular section 259 (for example in the direction of line X→X'), fluid is emitted out of the holes 261a-h.

Alternatively the holes may be arranged in a staggered manner along the length of the tubular section, as illustrated in FIG. 7b. FIG. 7b shows a portion of the tubular section 259. The tubular section 259 has a circular cross section along the length thereof. The line X-X' lines along the centre of the tubular section 259. There are seven circular holes 261a', 261b', 261c', 261d', 261e', 261f, 261g' and 261h' in the wall of the tubular section 259. The centre of hole 261a' is on one side of the line X-X' and the centre of the hole 261b' is on the other side of the line X-X', and so on.

In another example the plurality of holes 261 in the wall of the tubular section are arranged in a "domino five" pattern as shown in FIG. 7c.

In another example illustrated in FIG. 7d, the tubular section 259 has a slot 271 along the length thereof, instead of a plurality of holes as described above. Fluid, for example compressed air, may flow out of the slot when fluid is passed along the length of the tubular section 259.

In yet another example the tubular section 259 has a plurality of tubular nozzles 281 extending from the surface thereof, a section of which is shown in FIG. 7e. In FIG. 7e there are seven tubular nozzles 281a, 281b, 281c, 281d, 281e, 281f, 281g and 281h extending from the surface of the tubular section 259. All the nozzles 281 are arranged in the same direction relative to the cylindrical axis along the length of the tubular section 259, but each nozzle may be aligned differently, for example in a staggered arrangement as shown in FIG. 7b. Each nozzle 281 has an outlet orifice 282 at one end, the other end of each nozzle 281 being connected to a hole in the wall of the tubular section 259 i.e. essentially as shown in FIG. 7a with the tubular nozzle 281a-h extending from the respective hole 261a-h. When a fluid passes along the length of the tubular section 259, fluid may be emitted from the nozzles 281. With reference to nozzle 281a, the jet of fluid from the orifice 282 is emitted in the direction 269, which direction may be perpendicular to the cylindrical axis of the tubular section 259.

In these examples the tubular section has a circular cross-section, but tubular sections having different cross sections may be used, for example rectangular or square cross sections.

The choice of nozzle arrangement is made based on the degree of cooling required during the shaping stage. For example, with reference to FIG. 7a, the tubular section 259 may have an internal diameter between 15 mm and 30 mm. Each hole 261a-h may have a diameter between 1 mm and 10 mm, in particular between 1 mm and 5 mm. The spacing between adjacent holes 261a-h may be between 5 mm and 20 mm and the spacing thereof may be uniform. Any of the nozzle arrangements illustrated in FIGS. 7a-7e may be used in place of the array of nozzles 53. A typical air pressure supplied to such a nozzle arrangement may be less than 100 psi, for example between 10 psi and 80 psi.

Whatever type of nozzle is used in the array of nozzles, the array of nozzles are configured to direct cooling fluid such as air, in particular compressed air, upwards (i.e. with reference to FIG. 2, in the direction of arrows 69, 69' towards the die member 31) to directly strike the lower surface of a heat softened glass sheet during a press bending process, as will be discussed hereinafter.

FIG. 8 shows the press bending station 51 in a second configuration (a shaping configuration where the upper shaping die member 31 and the lower ring mould 9 have been moved towards each other and are pressing a heat softened sheet of glass 100 supported on the upper shaping surfaces 15, 17 of the ring mould 9. In this configuration the ring mould 9 and die member 31 are often referred to as being in a closed position.

The sheet of glass 100 has a soda-lime-silica glass composition. A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2% and $Fe_2O_3$ 0.005-2%. The glass composition may also contain other additives, for example, refining aids and other colourants, which would normally be present in an amount of up to 2%. The transmitted glass colour may be measured in terms of a recognised standard such as BS EN410. In the art, soda-lime-silica glass may also be referred to as soda-lime-silicate glass.

Preferably the glass sheet 100 has a thickness between 1 mm and 10 mm, more preferably between 1.5 mm and 4 mm, even more preferably between 1.5 mm and 2.5 mm, even more preferably between 1.6 mm and 2.3 mm.

The upper die member 31 is shown in a position having moved downwards towards the ring mould 9 by actuating the linear actuators 39, 41, the die member being mounted to the first and second die support members 35, 37 that are coupled to the respective linear actuator 39, 41.

Since the array of nozzles 53 are coupled to the supports 19, 21 via the respective elongate members 55, 57, actuation of the linear actuators 23, 25 to cause the first and second support members to move thereby causing movement of the ring mould 9, also moves the array of nozzles 53 at the same time. In an alternative to the embodiment shown, the array of nozzles 53 may be fixed to the base member 27. In another alternative the array of nozzles 53 may be provided with a separate actuator mechanism to move the array of nozzles upwards and downwards (i.e. in the direction of arrow 29) independently of the upwards and downwards movement of the ring mould 9.

As the glass sheet 100 is being press bent between the ring mould 9 and the upper die member 31, the glass sheet 100 remains on the shaping surfaces 15, 17 of the lower supports 11, 13 such that there is no movement of the glass sheet 100 on the shaping support other than any movement inherent to the pressing action that causes the glass sheet 100 to acquire the desired curvature. For example, when starting in the configuration shown in FIG. 2 with a glass sheet on the ring mould 9 i.e. in contact with the shaping surfaces 15, 17 of the lower supports 11,13, the separation of the ring mould 9 towards the upper die member 31 is reduced to reach the configuration shown in FIG. 8. With reference to FIG. 8, the ring mould is moved toward the die member 31 in the direction of arrow 29 and the die member is moved towards the ring mould 9 in the direction of arrow 45 (the directions 29, 45 are parallel to the vertical) to press bend the glass sheet 100.

Whilst in the second configuration shown in FIG. 8, which may last for a few seconds i.e. up to ten seconds, the valve 75 is actuated by control means (not shown) such that cooling air from fluid source 77 is provided to the array of nozzles 53 via the flexible pipe 73.

Two nozzles 61, 61' are shown in FIG. 8 and upon actuation of the valve 75 cooling air is directed towards the lower surface of the glass sheet 100 whilst the glass sheet is being press bent between the ring mould 9 and the die member 31. The lower surface of the glass sheet 100 is that major surface of the glass sheet 100 that is in contact with the shaping surface of the ring mould 9. The glass sheet 100 has an opposing major surface that may be referred to as the upper surface of the glass sheet. The upper surface of the glass sheet 100 is in contact with the shaping surface 33 of the shaping die 31 during the press bending step.

As illustrated, the nozzles are sufficiently spaced from the lower surface of the glass sheet so that the nozzles do not contact the lower surface of the glass sheet. The outlet end of the nozzles 61, 61' may be between 10 mm and 100 mm from the lower surface of the glass sheet during the press bending step. If the nozzles contact the lower surface of the heat softened glass sheet, optical distortion may result in the shaped glass sheet.

By blowing cooling air onto only the lower surface of the glass sheet during the press bending step, it has been found that the compressive stress in the lower surface of the glass sheet may be increased when the glass is cooled to room temperature, compared to the same bending process without blowing cooling air onto the lower surface of the glass sheet during the press bending step. Surface compression (or compressive) stress measurements may be made using a Strainoptics Laser GASP-CS (http://www.strainoptics.com/files/Laser %20GASP-CS %20Quick-Start %20(English) .pdf). Such equipment is available from Strainoptics, Inc., 108 W. Montgomery Avenue, North Wales, PA 19454 USA.

For example, without blowing cooling air onto the lower surface of the glass sheet during the press bending step, it was found that following an annealing step to cool the glass down to room temperature, the surface compressive stress in a peripheral region 75 mm inboard of the edge of the bent glass sheet was less than or equal to 10 MPa i.e. between 5 MPa and 9 MPa.

Upon using the same bending process it was found that by directing cooling air towards only the lower surface of the glass sheet during the press bending step it was possible to increase the surface compressive stress in the peripheral region 75 mm inboard of the edge of the bent glass sheet. It was found that following the same annealing step to cool the glass down to room temperature, the surface compressive stress in the peripheral region 75 mm inboard of the edge of the bent glass sheet could be increased by up to about 25 MPa, for example by between 5 MPa and 25 MPa.

It is preferred to increase the surface compressive stress in the peripheral region 75 mm inboard of the edge of the bent glass sheet by between 5 MPa and 25 MPa, preferably by between 5 MPa and 15 MPa, more preferably by between 7 MPa and 15 MPa.

The surface compressive stress in a peripheral region 75 mm inboard of the edge of a bent glass sheet example may be influenced by the type of shaping process used to shape the glass sheet. For example, using a press bending station having a similar configuration to that shown in FIGS. 2 and 8, the surface compressive stress in a peripheral region 75 mm inboard of the edge of the bent glass sheet may be up to 20 MPa, for example between 2 MPa and 20 MPa. By using the present invention on this particular press bending station, it would be expected to increase the surface compressive stress in the peripheral region 75 mm inboard of the edge of the bent glass sheet, for example by up to about 25 MPa i.e. an increase of between 5 MPa and 25 MPa.

The increase of surface compressive stress in the peripheral region 75 mm inboard of the edge of the bent glass sheet may also be influenced by the air pressure supplied to the array of nozzles. For example, supplying the cooling air to the array of nozzles 53 for a fixed time during the press bending step, it was found that using higher air pressure supplied to the array of nozzles 53 resulted in higher surface compressive stress in the peripheral region 75 mm inboard of the edge of the bent glass sheet.

Furthermore by incorporating apparatus comprising the array of nozzles into the press bending station, it is possible to actuate the cooling during press bending only when required i.e. the same press bending station 51 may be used instead of a press bending station 1.

In accordance with an embodiment of the present invention, cooling air is directed towards only the lower surface of the glass sheet when the glass sheet is being shaped.

The cooling air is directed to cool selective regions of the glass sheet during shaping, in particular the peripheral regions thereof. The cooling air provides additional cooling to any natural cooling that may occur when the glass sheet is being shaped.

Once cooled, the bent glass sheet 100 may be used as a monolith or may be laminated to another sheet of glass, for example to make a vehicle windscreen or side window. It is preferred that the glass sheet bent according to the present invention is the outer ply in such a laminate. When the glass sheet bent according to the present invention is the outer ply in a laminated glazing, in particular a vehicle windscreen, it is preferred that, using conventional nomenclature, the cooling air is directed onto the glass surface that will be surface 1 in the laminated glazing.

The other (second) sheet of glass in the laminated glazing may have a different composition and/or have been bent using a different bending process, for example a gravity sag bending process.

By increasing the surface compressive stress in the peripheral region, the bent glass sheet once laminated as the outer ply in a laminated glazing may have the surface compressive stress modified due to lamination stresses i.e. before lamination, the inner and outer ply do not form a nested pair. The increase in surface compressive stress helps balance the lamination stresses to provide a laminated glazing with suitable stress characteristics.

FIG. 9 is a graph showing a shaping sequence and different air blowing sequences during the shaping sequence. Axis 500 represents time in seconds with each major unit on this axis being one second. In this example the shaping sequence is a press bending operation as described with reference to the previous figures.

Line 502 shows the variation with time of the position of a pair of complementary press bending members when shaping a sheet of glass therebetween. The press bending members may be as described with reference to FIG. 8, for example an upper die member 31 and a lower ring mould 9.

At time t=t1, the press bending members are closed and the shaping configuration has been reached (as shown in FIG. 8). Each press bending member is in the shaping position such that a heat softened glass sheet is press bent between the two press bending members.

At time t=t4, the press bending members are moved apart (i.e. opened) such that the glass sheet is no longer being pressed between the press bending members. For example the ring mould 9 and the shaping die 31 may be moved to the positions shown in FIG. 2. When the upper die member 31 is moved away from the ring mould 9 following the press bending step, the bent glass may be supported on the shaping surface 33 of the die member 31 by provision of a vacuum through openings in the shaping surface 33.

The duration of the shaping step i.e. the press bending step is therefore (t4−t1) seconds.

Line 504 shows how in one embodiment the array of nozzles are used to direct cooling air towards the lower glass surface during the entire duration of the shaping or pressing step. That is, with reference to FIG. 8, the valve 75 is actuated such that the array of nozzles directs cooling air towards the glass surface beginning at time t=t1 to end at time t=t4 when the air supply is switched off by suitable actuation of valve 75. In this example the air pressure to the array of nozzles was kept constant for the duration that cooling air was being directed onto the glass surface i.e. between times t1 and t4.

Line 506 shows how in another embodiment the array of nozzles are suitably switched on such that cooling air is directed onto the glass surface beginning at time t=t2 where t2>t1. The cooling air is then switched off at time t=t4 by suitable actuation of the valve 75. As such, there is a delay in switching on the cooling air after the press bending members have reached the shaping position. Again in this example the air pressure was constant for the duration of the air pulse i.e. between t2 and t4. The cooling air was directed onto the glass surface for a duration of (t4−t2) seconds.

Line 508 shows how in another embodiment the cooling air is switched on at time t=t1 and is then switched off at time t=t3, where t3<t4. As such, the cooling air pulse is switched off before the end of the press bending step. The cooling air was kept at the same pressure for the duration that the cooling air was directed onto the glass surface i.e. between t1 and t3. The cooling air was directed onto the glass surface for a duration of (t3−t1) seconds.

Line 510 shows how in another embodiment the cooling air is switched on at time t=t2 where t2>t1 and is then switched off at time t=t3, where t3<t4. As such, there is a delay in switching on the cooling air after the shaping members have reached the shaping position and the cooling air is switched off before the end of the shaping step. Again in this example the air pressure was kept constant for the duration that the cooling air was directed onto the glass surface i.e. between t2 and t3. The cooling air was directed onto the glass surface for a duration of (t3−t2) seconds.

Line 512 shows how in another embodiment the cooling air is switched on at time t=t2 where t2>t1. The cooling air is then switched off at time t=t5, where t5>t4. As such, the cooling air remains being directed towards the glass surface after the completion of the press bending step. Again the air pressure was kept the same for the duration that the cooling air was directed onto the glass surface i.e. between t2 and t5. The cooling air was directed onto the glass surface for a duration of (t5–t2) seconds. For example, using the cooling sequence represented by line 512, the surface compressive stress may be increased from a baseline level with no cooling by up to 15 MPa, for example between 7 MPa and 12 MPa, in a peripheral region 75 mm inboard of the edge of the bent glass sheet. In contrast, using the same shaping conditions but using the cooling sequence shown by line 504, the surface compressive stress may be increased from the baseline level with no cooling by up to 25 MPa, for example between 10 MPa and 20 MPa.

It is also within the scope of the present invention that the air pressure may vary between the switching on time and the switching off time of the cooling air pulse. For example with reference to line 504, the cooling air may have a different pressure at time t=t1 compared to at time t=t4 (the cooling air being provided to the array of nozzles being either higher pressure or lower pressure at time t=t1 compared to time t=t4).

FIG. 10 shows another press bending station 151 for press bending a sheet of glass 200.

In this example the lower shaping support 179 has a convex shaping surface. A heat softened glass sheet 200 is allowed to sag on the convex shaping surface, and is pressed against the convex shaping surface by an upper pressing ring 181. The upper pressing ring 181 is in mechanical communication with a fixed upper gantry 183 such that the upper pressing ring is movable relative to the gantry, for example by mounting the pressing ring on suitable supports 185, 187 coupled to respective linear actuators 189, 191 that are fixed to the gantry. In this example the lower shaping support 179 is in a fixed position relative to the gantry but may be movable relative thereto. The upper shaping ring 181 is movable relative to the gantry. The upper pressing ring 181 is similar to the lower ring mould 9 described with reference to FIG. 1.

An array of nozzles 53 is attached to the supports 185, 187 for movement with the upper shaping ring. The array of nozzles 53 is as described with reference to FIG. 2, but instead of directing jets of cooling air upwards, the jets of cooling air are directed downwards. In this embodiment, during the press bending step cooling air is directed only towards the major surface of the glass sheet 200 not in contact with the lower shaping support 179 i.e. the major surface facing the array of nozzles 53.

Although not shown in FIG. 10, the array of nozzles is in fluid communication with a suitable valve and fluid supply in a manner as previously described with reference to FIG. 2.

FIG. 11 shows apparatus 351 for bending a glass sheet under the influence of gravity, often referred to as "sag bending", "gravity sag bending" or "gravity bending". In this embodiment of the present invention, a flat glass sheet is positioned on a ring mould, heated to a softening temperature and allowed to sag thereon under the influence of gravity.

The ring mould 309 is similar to the ring mould 9 described in relation FIG. 1 in that it has an upper shaping surface for contacting a major surface of the glass sheet during the glass shaping. However in this example the ring mould 309 is fixed directly to the base 307 and not movable relative thereto. Usually the ring mould 309 is position on a conveyor system to pass the ring mould 309 with flat glass sheet thereon through a suitable heating furnace to raise the glass temperature to a sufficiently high level to allow gravity sag bending on the ring mould to occur.

Ring mould are also known having articulated portions to impart additional curvature to certain parts of the glass as the or each articulated portion moves from an initial position to a final position.

The glass sheet softens under the influence of the heat and sags into conformity with the ring mould 309. An additional upper die (not shown) may be used to assist the with the gravity bending. The same array of nozzles 53, flexible pipe 73, valve 75 and fluid supply 77 as used in FIG. 2 is also used in this embodiment. The bent glass sheet 300 is shown in the figure.

Unlike during a press bending step when it is possible to define the press bending process as beginning when the press bending members are "closed" i.e. in the shaping position, for a gravity bending process it is more difficult to define an actual start to the shaping process. However for the purpose of the present invention the sag bending process is defined as having begun when for a soda-lime-silica glass composition, the glass sheet has reached a temperature of 550° C.

Although the previous examples have been described with reference to an array of nozzles for providing cooling fluid onto a portion of the glass surface during the bending step, a heat exchange device may be used to extract heat from the heat softened glass sheet during glass shaping.

As an example of such a heat exchange device FIG. 12 shows a shaping ring 609 incorporating such a heat exchange device. The shaping ring 609 is similar to the ring mould 9 described with reference to FIG. 1.

The shaping ring 609 has four walls 611, 612, 613 and 614 arranged such that in plan view, the shaping ring 609 has the same configuration as the ring mould 9 shown in FIG. 3. The shaping ring 609 has an upper shaping surface 617 for supporting a glass sheet thereon. The shaping ring 609 may be used in a press bending operation in which case an upper male die member would also be provided having a complementary shaping surface.

The four walls 611, 612, 613, 614 of the shaping ring define an opening in which is located the heat exchange device 653. The heat exchange device 653 comprises a tube 659 in an annular configuration having an inlet 660 and an outlet 661. The inlet 660 is in fluid communication with an inlet tube 662 and the outlet 661 is in fluid communication with an outlet tube 663. Suitable material for the tubes includes stainless steel.

The tube 659 of the heat exchange device is mounted to the inner surface of the walls of the shaping ring by eight mounts, only four of which are labelled as 654, 655, 656 and 657 for clarity. The surface of the tube 659 is below the shaping surface 617 of the shaping ring such that when a glass sheet is bent on the shaping ring, the glass sheet does not contact the tube 659. Other suitably configured heat exchange device may be used that does contact the glass sheet during the shaping process.

At the inlet tube 662 a cooling fluid i.e. a liquid such as water or oil, is introduced to flow in the direction of arrow 667. The liquid flows around the heat exchange tube and then flows out of the outlet tube 663 in the direction of arrow 669. The cooling liquid allows heat to be extracted from the glass sheet during the shaping step. The heat exchange device may be used instead of, or in addition to, an array of nozzles as previously described.

FIG. 13 shows a schematic cross-sectional representation of part of a glass bending line 701 incorporating a press bending station 51 of the type shown in FIG. 2.

The glass bending line 701 comprises a heating furnace 702, a press bending furnace 704 and an annealing furnace 706.

A roller conveyor bed 708 extends through the heating furnace 702, the press bending furnace 704 and the annealing furnace 706 to define a path of conveyance for a glass sheet 700. The roller conveyor bed comprises a plurality of rollers 710 configured to convey a glass sheet 700 in the direction of arrow 712. In this example the glass sheet 700 is shown to be in contact with the rollers 71, but the glass sheet 700 may be positioned on a carriage, the carriage being in contact with the rollers 710. As an alternative to rollers 710, or in addition to rollers 710, an air flotation device may be used to convey the glass sheet in the direction of arrow 712.

In the heating furnace 702 the glass sheet 700 is heated to a temperature suitable for shaping or bending. The furnace may incorporate electric/gas heating and convective heating as required.

Inside the press bending furnace 704 is press bending station 51 as previously described. When the glass sheet 700 is conveyed to between the lower ring mould 9 and the die member 31, the glass sheet is positioned on the ring mould 9 for subsequent press bending. Methods are known in the prior art for transferring the glass sheet from the conveyor rollers 710 to the ring mould 9, for example some of the conveyor rollers may be configured as drop rollers, or a vacuum platen may be used to lift the heat softened glass sheet from the conveyor rollers for depositing onto a suitably configured ring mould 9.

The upper die member 31 and/or linear actuators 39, 41 is/are in electrical communication with a control means 714, such as a computer, for controlling the movement of the die member 31 by suitable actuation of the linear actuators 39, 41. The control means 714 may be in electrical communication with other parts of the glass bending line 701, for example the conveyor roller bed 708 to control the speed of the rollers.

With the glass sheet 700 positioned on the ring mould 9, the ring mould 9 and upper die 31 are moved towards each other (in direction of arrow 45) for press bending the glass sheet 700.

When the die member 31 and the lower ring mould 9 are in the shaping position (see FIG. 8), the control means 714 sends a signal to the valve 75. The valve 75 then opens and air from fluid supply 77 passes through the coupling pipe 73' that is in fluid communication with the valve 75 and the flexible pipe 73. Cooling air is then able to flow through the nozzles towards only the lower surface of the bent glass sheet during the shaping operation (the press bending step) as previously described.

The valve 75 is in electrical communication with the control means 714 via suitable cabling 78. The fluid source 77 may be in electrical communication with the control means 714 via suitable cabling 76.

When the glass sheet is on the ring mould 9 and being press bent, it is preferred that the glass sheet does not move relative to the ring mould, other than to conform to the shaping surfaces of the ring mould and the die member. For example, at the beginning of the press bending process when the press bending members are "closed", a point p1 on the glass surface facing the ring mould 9 is coincident with a point p2 on the ring mould 9. It is preferred that throughout the press bending step (i.e. between t1 and t2 in FIG. 9), the points p1 and p2 are coincident and there is no relative movement therebetween.

A carrier ring 718 is shown between the press bending furnace 704 and annealing furnace 706 and is movable between the position shown in FIG. 13 to a position between the die member 31 and the ring mould 9 by suitable actuators (not shown) i.e. by moving in the direction of arrow 720. The actuators controlling the movement of the carrier ring 718 may also be controlled by the control means 714.

Once a glass sheet is being shaped between the die member 31 and the ring mould 9, a vacuum may be provided to openings in the shaping surface of the die member 31 to hold the glass sheet against the convex shaping surface of the die member 31. The ring mould 9 may then be lowered in the direction of arrow 29 and die member raised in the direction of arrow 45. The carrier ring 718 moves to be between the glass sheet supported on the shaping surface 33 of the die member 31 and the ring mould 9. The vacuum provided to the openings in the shaping surface of the die member 31 may then be removed, possibly with a subsequent jet of air applied to the same openings in the shaping surface of the die member to urge the bent glass sheet therefrom. The bent glass sheet then drops onto the suitably positioned carrier ring 718 to be supported thereon and the carrier ring moves back to the position shown in FIG. 13 to deposit the bent glass sheet onto the conveyor section 708' for subsequent conveyance in the direction of arrow 712 into the annealing furnace 706.

Although in the figures previous figures the ring mould 9 and the die member 31 are shown as having exposed shaping surfaces 15, 15 and 33 respectively, in preferred embodiments either or both the ring mould 9 and die member 31 may be provided with a protective cover to cover and protect the shaping surface of the respective mould member(s) from damage and wear. Preferably the cover comprises a cloth made of, for example, stainless steel, fibre glass, polyphenyleneterephthalamide fibres (e.g. Kevlar™), materials blended Kevlar™, polybenzoxale (PBO) fibres containing graphite (e.g. Zylon™), or various weaves of these fibres.

The press bending station 51 may be used to bend an outer ply of a laminated glazing for a vehicle, for example a vehicle windscreen or side window. The outer ply may have a soda-lime-silica glass composition and have a thickness between 1 mm and 10 mm, in particular 1.5 mm and 2.5 mm. As is evident from FIGS. 8 and 13, when the outer ply of a laminated glazing for a vehicle, for example a vehicle windscreen, is made using the glass bending line 701, using conventional nomenclature, surface 1 of the laminated glazing has been cooled by directing cooling air onto said surface during the press bending step.

The inner ply of such a laminated glazing may be produced as follows.

A sheet of chemically strengthenable glass is provided and will be used for the inner ply of the laminated glazing i.e. a vehicle windscreen. Suitable chemically strengthenable glass compositions include alkali aluminosilicates compositions such as those described in U.S. Pat. No. 7,666,511 B2. Other suitable chemically strengthenable glass compositions are described in WO2014/148020A1 and WO99/48824A1.

A specific composition for the inner ply is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published.

The sheet of chemically strengthenable glass is 1 mm thick and is cut to have the same periphery as the unbent outer ply (although may be slightly smaller in dimensions to account for this being the inner ply). The sheet of chemically strengthenable glass may have a thickness between 0.4 mm and 1.2 mm, or a thickness between 0.5 mm and 1 mm.

The sheet of chemically strengthenableglass may be suitably edge worked and washed prior to being bent.

The sheet of chemically strengthenable glass is placed on a suitable ring mould to support the sheet of chemically strengthenable glass close to the periphery thereof. The sheet of chemically strengthenable glass is heated to sufficient temperature to cause the chemically strengthenable glass sheet to soften and sag under the influence of gravity, conventionally referred to as sag bending. The glass sag bends to a shape close to that of the shaped outer ply produced using the method according to the first aspect of the present invention. However the curvature of the inner ply may not be the same as the outer ply.

The bent inner ply of chemically strengthenable glass is then annealed using controlled cooling to reduce the temperature to room temperature.

The bent inner ply of chemically strengthenable glass is chemically strengthened using an ion exchange process. Typically sodium ions are chemically exchanged for potassium ions. A flat sheet of chemically strengthenable glass may also be chemically strengthened.

For the specific composition mentioned above, it is possible to chemically strengthen the inner ply to have surface compressive stress greater than 400 MPa, typically between 450 MPa and 675 MPa. The depth of layer (DOL) of the chemically strengthened glass ply may be between 10 μm and 60 μm.

It is also envisaged that the bent inner ply may be thermally toughened although it is difficult to thermally toughen plies of glass that have a thickness of 1 mm or less.

In an embodiment, to produce the laminated glazing a bent outer ply having a soda-lime-silica glass composition and a bent inner ply having a glass composition that has been bent and chemically strengthened as described above are provided.

The pair of bent inner and outer plies are washed and a ply of interlayer material having a thickness between 0.3 mm and 1.5 mm is positioned between the inner ply and the outer ply. In this particular example the interlayer material was a 0.76 mm thick ply of PVB, although other suitable adhesive interlayer material may be used, for example ethylene vinyl acetate (EVA) or acoustic modified PVB.

The assembly of inner ply and outer ply with PVB ply therebetween are laminated using suitable lamination conditions to join the inner ply to the outer ply via the PVB ply.

The laminated glazing so produced has modified stress characteristics compared to bending the outer ply without the provision of deliberate cooling of selected regions of the outer ply during the shaping step. Any lamination stresses introduced to the laminated glazing following lamination are compensated for by the modified compressive stressed produced in the outer ply when the outer ply is shaped in accordance with the present invention.

Methods of shaping a glass sheet are described comprising the steps (i) providing a shaping support for supporting the glass sheet; (ii) heating the glass sheet to a temperature for shaping; (iii) positioning the glass sheet on the shaping support; and (iv) shaping the glass sheet on the shaping support, wherein during step (iv) at least one portion of the glass sheet is deliberately cooled. In preferred embodiments the shaping step (iv) comprises press bending a heat softened glass sheet between a lower shaping support and an upper shaping member, wherein during step (iv) only a portion of the major surface of the glass sheet facing the lower shaping support is cooled by directing one or more jet of air onto said portion. The shaped glass sheet finds particular use in a laminated glazing. Apparatus useful in carrying out the method of shaping is also described.

The present invention provides a particular advantage for controlling the stress in an outer ply of a laminated glazing when the inner glass ply has not been bent to the same precision as the outer ply. By using the present invention the outer ply in the resulting laminated glazing may have improved impact performance and scratch resistance in a peripheral region extending around the perimeter of the outer ply, compared to the same laminated glazing produced without using the present invention.

The invention claimed is:

1. A method of shaping a glass sheet, the glass sheet having a first major surface and a second opposing major surface, the method comprising:

heating the glass sheet to a temperature for shaping;

positioning the glass sheet on a shaping support such that the first major surface of the glass sheet is in contact with the shaping support, the shaping support being configured as a ring mold to contact the glass sheet at a peripheral region of the glass sheet;

shaping the glass sheet on the shaping support by pressing the glass sheet between the shaping support and a shaping member; and deliberately cooling at least a first portion of the glass sheet during the shaping of the glass sheet on the shaping support;

wherein the first portion of the glass sheet is deliberately cooled by directing at least a first jet of fluid towards the first major surface of the sheet of glass to directly strike the first portion of the glass sheet without directly striking the peripheral region of the first major surface when the glass sheet is being shaped on the shaping support by pressing the glass sheet between the shaping support and the shaping member;

wherein the shaping support has at least one shaping rail configured to contact the peripheral region of the first major surface of the glass sheet; and wherein the first portion of the glass sheet is inward of the peripheral region of the glass sheet.

2. The method according to claim 1, further comprising deliberately cooling a second portion of the glass sheet during the shaping of the glass sheet on the shaping support.

3. The method according to claim 1, wherein the deliberate cooling of the first portion of the glass sheet begins at the same time as the shaping of the glass sheet on the shaping support begins or the deliberate cooling of the first portion of the glass sheet begins after the shaping of the glass sheet on the shaping support begins but before the shaping of the glass sheet on the shaping support has ended.

4. The method according to claim 1, wherein the duration of the deliberate cooling of the first portion of the glass sheet is the same as the duration of the shaping of the glass sheet on the shaping support and/or wherein the deliberate cooling of the first portion of the glass sheet is continued after the glass has been shaped.

5. The method according to claim 1, wherein there is no relative movement between the glass sheet and the shaping support during the shaping of the glass sheet on the shaping support.

6. The method according to claim 1, wherein following the shaping of the glass sheet on the shaping support there is a surface compressive stress in the first portion of less than or equal to CS MPa, where CS is 40.

7. The method according to claim 1, wherein following the shaping of the glass sheet on the shaping support the shaped glass sheet is laminated to at least another glass sheet using an interlayer structure comprising at least one sheet of adhesive interlayer material.

8. The method according to claim 7, wherein the shaped glass sheet is an outer ply in a laminated glazing.

9. The method according to claim 7, wherein the shaped glass sheet has a soda-lime-silica composition and the at least another glass sheet has been chemically strengthened prior to being laminated to the shaped glass sheet.

10. The method according to claim 1, wherein the shaping member is a die member having a shaping surface for contacting the second major surface of the glass sheet during shaping.

11. The method according to claim 1, wherein the shaping member comprises at least two movable shaping members.

12. The method according to claim 1, wherein the shaping support has a concave shaping surface and the shaping member has a convex shaping surface that is complementary to the concave shaping surface of the shaping support.

13. The method according to claim 1, wherein the shaping member has a shaping surface having one or more openings therein, wherein at least one of the one or more openings in the shaping surface of the shaping member is in fluid communication with a low pressure source.

14. The method according to claim 1, wherein the shaping member is provided with a protective cover such that the protective cover of the shaping member contacts the glass sheet during shaping.

15. The method according to claim 1, further comprising heating the ring mold.

16. The method according to claim 1, wherein following the shaping of the glass sheet on the shaping support there is a surface compressive stress in the first portion, and the surface compressive stress in the first portion is increased by between 5 MPa and 25 MPa compared to the surface compressive stress in the first portion when there is no deliberate cooling during the shaping of the glass sheet on the shaping support.

17. A method of shaping a glass sheet, the glass sheet having a first major surface and a second opposing major surface, the method comprising:

heating the glass sheet to a temperature suitable for shaping;

positioning the glass sheet on a shaping support such that the first major surface of the glass sheet is in contact with the shaping support, the shaping support being configured as a ring mold to contact the glass sheet at a peripheral region of the glass sheet;

shaping the glass sheet on the shaping support by making shaping contact between a shaping member and the second major surface of the glass sheet, thereby shaping the glass sheet between the shaping support and the shaping member, wherein during the shaping of the glass sheet on the shaping support when the glass sheet is being shaped by shaping contact between the shaping member and the second major surface of the glass sheet, a first portion of the first major surface of the glass sheet is deliberately cooled by directing at least one jet of fluid onto the first portion of the first major surface without being directed onto a peripheral region of the first major surface; and during the shaping of the glass sheet on the shaping support when the glass sheet is being shaped by shaping contact between the shaping member and the second major surface of the glass sheet, there is no jet of fluid directed onto the second major surface of the glass sheet when the glass sheet is on the shaping support;

wherein the shaping support has at least one shaping rail configured to contact the peripheral region of the first major surface of the glass sheet; and wherein the first portion of the glass sheet is inward of the peripheral region of the glass sheet.

18. The method according to claim 17, further comprising heating the ring mold.

19. The method according to claim 17, wherein following the shaping of the glass sheet on the shaping support there is a surface compressive stress in the first portion, and the surface compressive stress in the first portion is increased by between 5 MPa and 25 MPa compared to the surface compressive stress in the first portion when there is no deliberate cooling during the shaping of the glass sheet on the shaping support.

* * * * *